April 11, 1961  J. B. ARMITAGE ET AL  2,978,965
TORQUE LIMITING CONTROL
Filed June 13, 1955  9 Sheets-Sheet 1

INVENTORS
Joseph B. Armitage,
BY James N. Flannery

Leroy J. Wutschel
Attorney

April 11, 1961

J. B. ARMITAGE ET AL 2,978,965

TORQUE LIMITING CONTROL

Filed June 13, 1955

INVENTORS.
Joseph B. Armitage,
James N. Flannery
BY
Elroy J. Wutschel
Attorney

April 11, 1961  J. B. ARMITAGE ET AL  2,978,965
TORQUE LIMITING CONTROL
Filed June 13, 1955  9 Sheets-Sheet 3

INVENTORS
Joseph B. Armitage, &
James N. Flannery
BY
Elroy J. Wutschel
Attorney

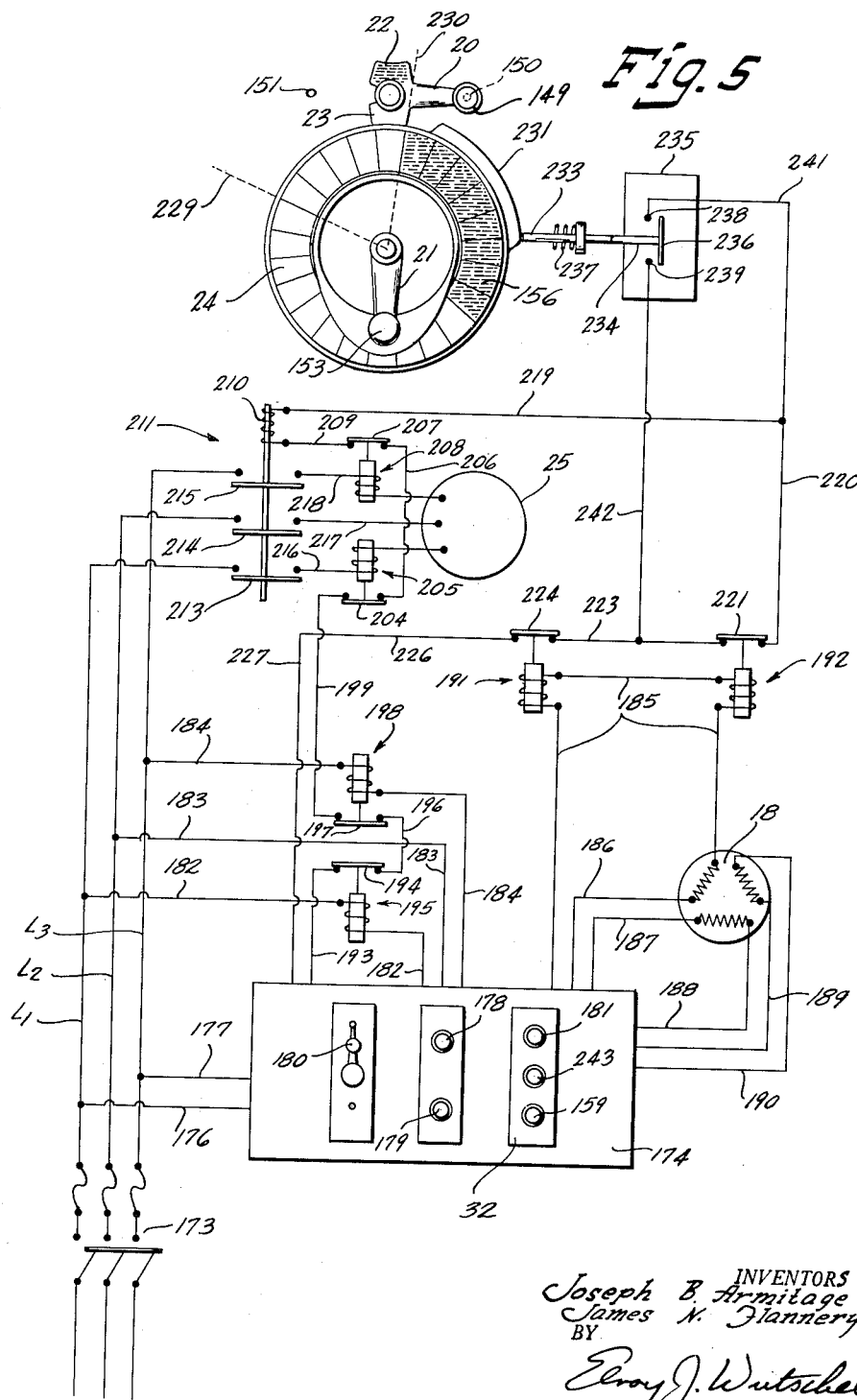

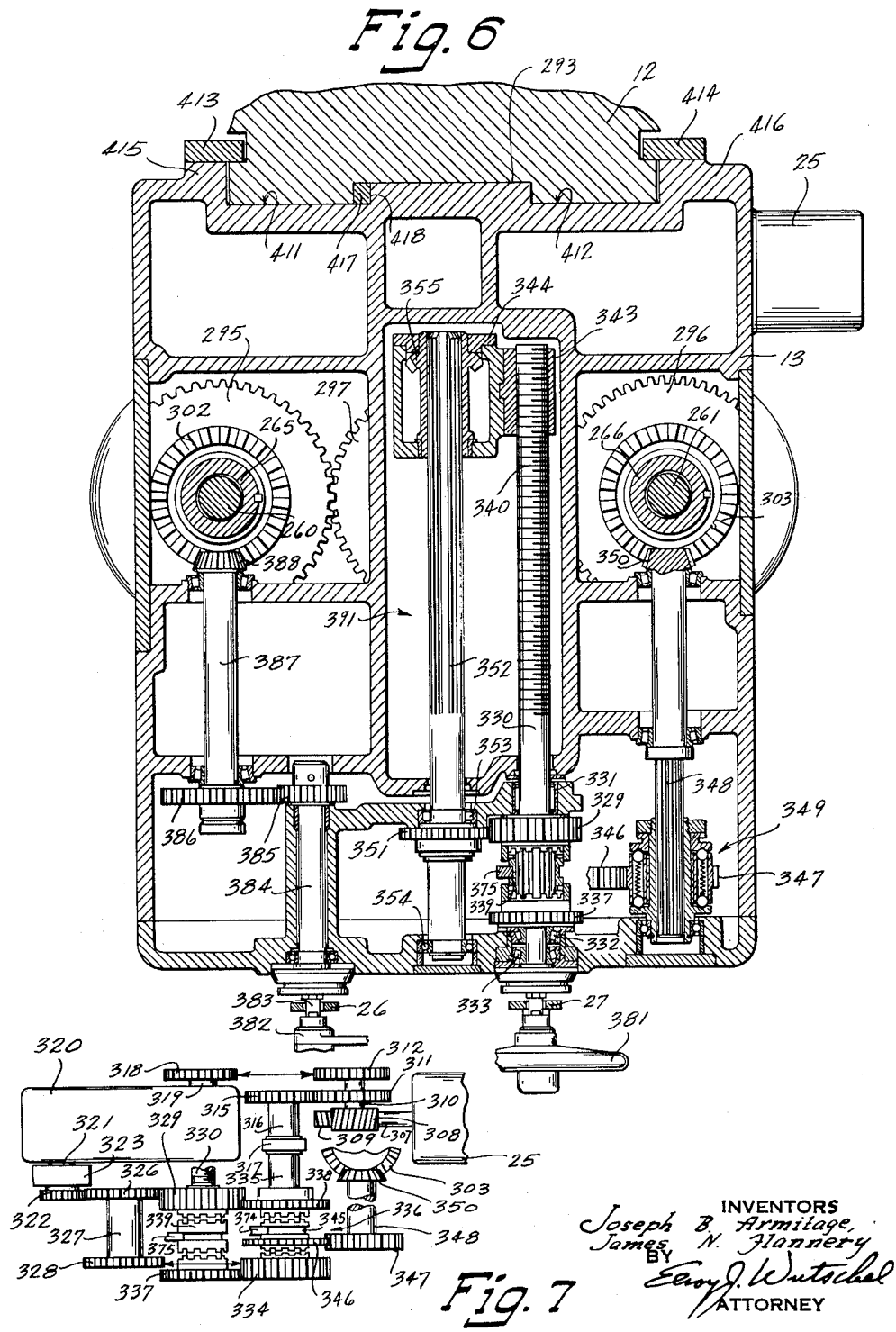

April 11, 1961 J. B. ARMITAGE ET AL 2,978,965
TORQUE LIMITING CONTROL
Filed June 13, 1955 9 Sheets-Sheet 6

INVENTORS
Joseph B. Armitage,
James N. Flannery
BY
Elroy J. Wutschel
Attorney

INVENTORS
Joseph B. Armitage,
James N. Flannery
BY
Elroy J. Wutschel
Attorney

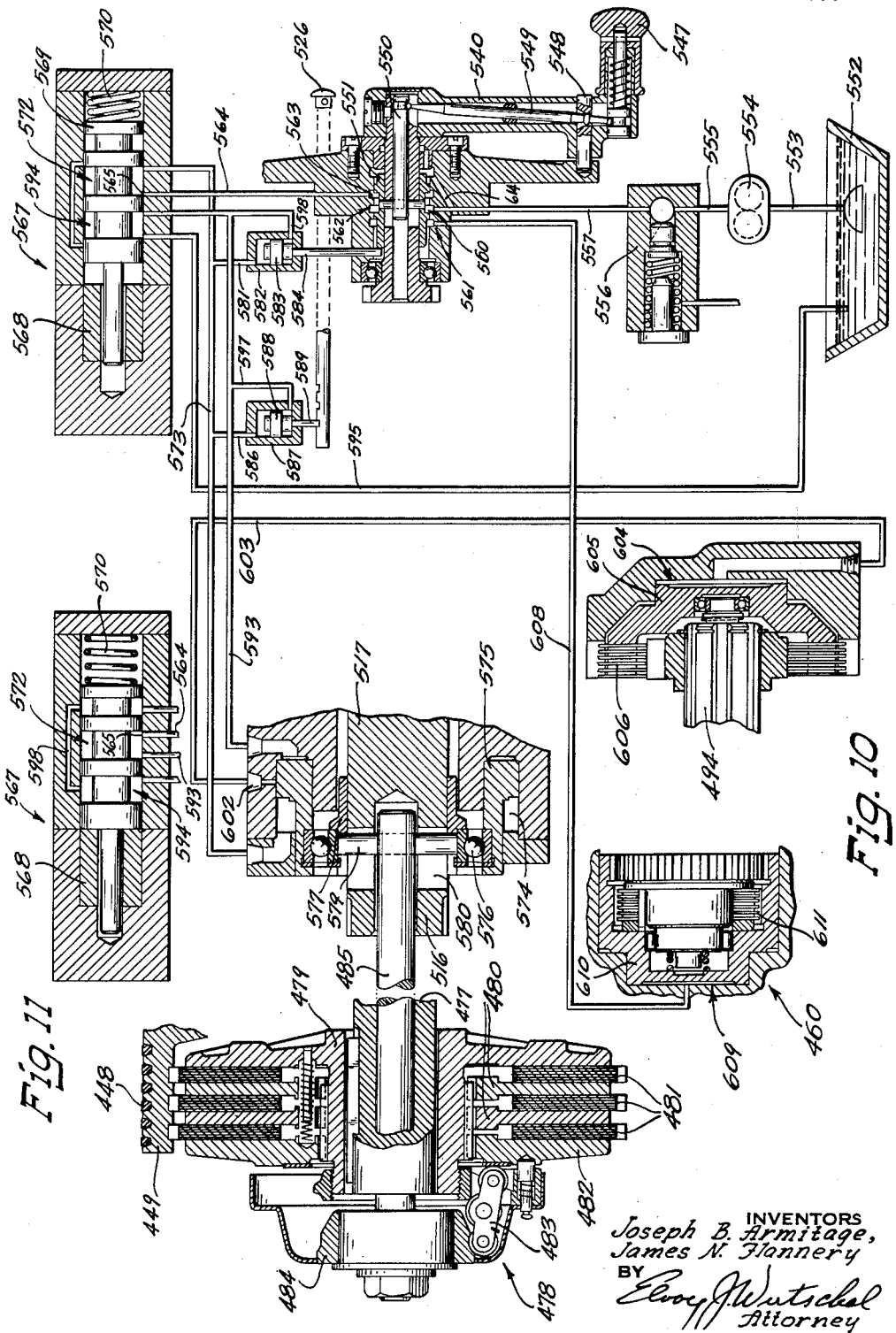

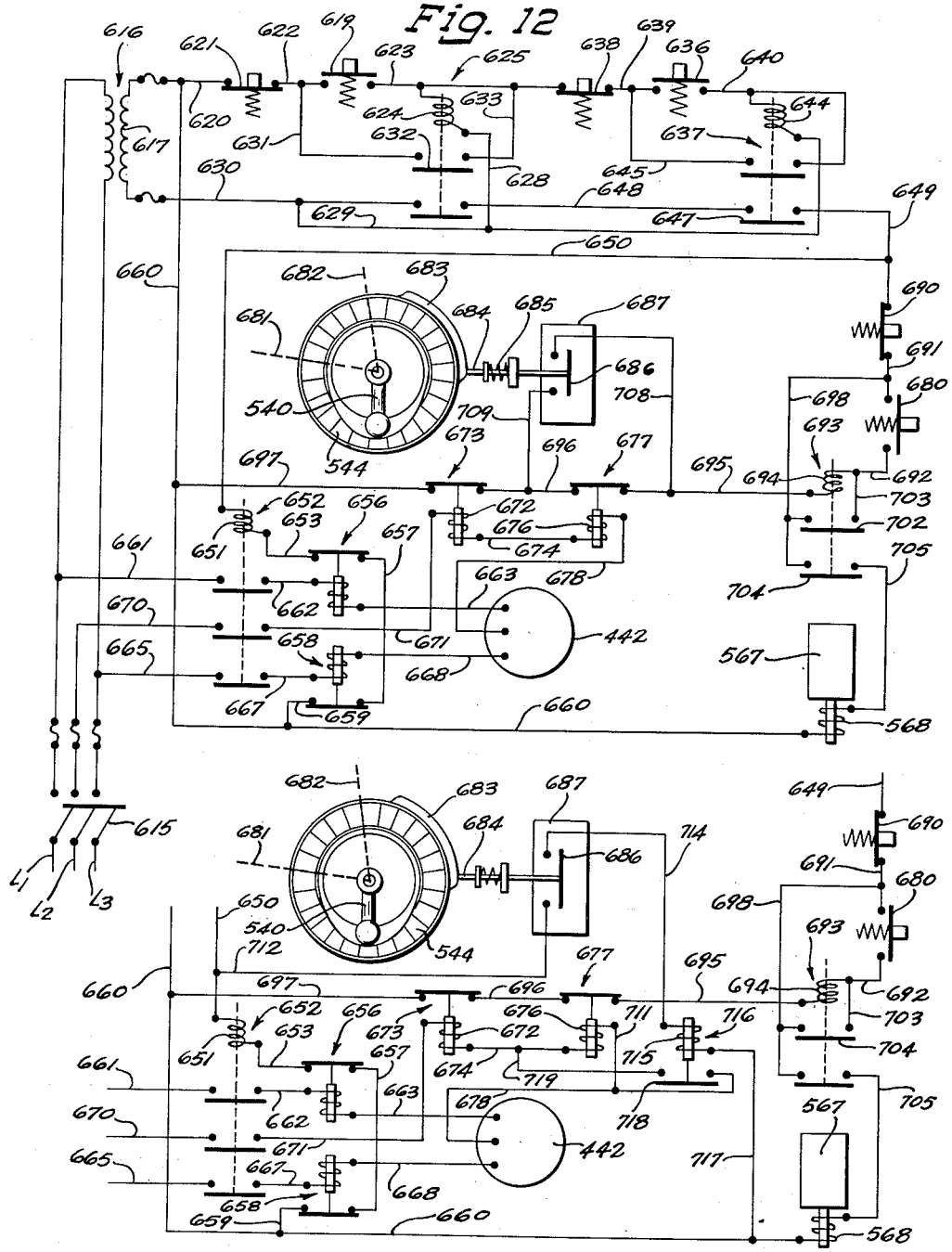

United States Patent Office 2,978,965
Patented Apr. 11, 1961

2,978,965
TORQUE LIMITING CONTROL

Joseph B. Armitage, Milwaukee, and James N. Flannery, West Allis, Wis., assignors to Kearney & Trecker Corporation, West Allis, Wis., a corporation of Wisconsin Filed June 13, 1955, Ser. No. 515,076

7 Claims. (Cl. 90—21)

The present application is a continuation-in-part of our copending U.S. patent application, Serial No. 139,342 which issued as Patent No. 2,736,243.

This invention relates generally to improvements in machine tools and more particularly to an improved torque limiting control mechanism for the spindle speed transmission of a milling machine.

Until recently, the types of cutting tools available and the methods of utilizing those tools were of such a nature that the maximum power available on the larger capacities of milling machines was more than adequate to drive any cutting tool that might be utilized on the machine at its maximum capacity for removing metal. Under those conditions, a variable speed spindle driving transmission mechanism interposed between the driving motor and the tool carrying spindle could be arranged to provide as wide a range of output speeds as was necessary for efficient operation while being capable of transmitting the full power of the driving motor at any selected speed.

More recently however, improvements in the utilization of cutting tools have made possible a tremendous increase in the rate at which metal can be removed from a workpiece. This in turn has necessitated an increase in the power required to drive a tool spindle with maximum efficiency in performing a cutting operation. In the milling of steel particularly, the power required to rotate a tool spindle at high speeds for removing metal at a faster rate, may be three or four times as great as the power available in prior types of machine tools. Although machines could be proportioned to transmit the full power of the higher powered driving motor at the higher speeds, the overall allowable range of spindle driving speeds would be seriously restricted because of the excessive torque developed if the full power of a higher powered motor were applied at low spindle driving speeds. Thus, in machines provided with sufficient power capacity to drive a tool spindle at high speeds in order to utilize the newer cutting techniques, the range of spindle driving speeds has been necessarily restricted due to the variations in torque inherent in a variable speed transmission mechanism, by eliminating the lowest speeds in which the torque developed would be much higher although the power requirements would be much lower than in the higher speeds.

A general object of the invention is to provide an improved torque limiting control device disposed to protect a variable speed transmission mechanism having a graduated power transmitting capacity against excessive torque at any selected output speed.

Another object is to provide a compactly arranged variable speed transmission mechanism disposed to provide so wide a range of output speeds as to be limited in its power transmitting capacity at extremely low speeds, in combination with an improved torque limiting control device arranged to protect the transmission against excessive torque at the lower speeds.

Another object is to provide an improved speed controlling mechanism for a milling machine disposed to synchronously control a variable speed transmission mechanism and an overload control mechanism arranged to protect the transmission against a degree of overload that varies according to the selected output speed thereof.

Another object is to provide an improved torque limiting control device which may be predeterminately adjusted to deenergize a work feeding motor on the occurrence of a predetermined degree of load on a spindle driving motor in order to protect a variable speed spindle driving transmission mechanism against excessive torque in driving a tool spindle cooperatively associated with work feeding means driven by the feeding motor.

A further object is to provide an improved torque limiting control device which is predeterminately adjusted and selectively operable to deenergize a power source on the occurrence of one or another of several varying degrees of overload.

According to this invention, a machine tool such as a milling machine, is provided with a high powered motor operatively connected to drive a tool spindle with relatively high torque at high rates of speeds for faster removal of metal from a workpiece. A cooperating work supporting member is disposed to be selectively driven along three mutually transverse lines of movement by means of a separate work feeding motor that is electrically interconnected with the spindle driving motor. To drive the tool spindle at any selected speed within a wider than usual range of operating speeds, an improved variable speed transmission mechanism is operatively interposed between the spindle driving motor and the tool spindle. The transmission mechanism is arranged to have sufficient torque transmitting capacity to transmit the full power of the relatively high powered driving motor when adjusted to drive the tool spindle at high speeds. Because of the wider than usual range of operating speeds however, and the correspondingly greater mechanical advantage obtained in the lower speeds, torque exceeding the power transmitting capacity of the transmission would be developed if the full power of the motor were applied with the transmission adjusted to operate in the lowest speeds. For this reason, if the transmission mechanism is not to be excessively large and heavy, it is necessarily limited in its power transmitting capacity in the lowest speeds. To protect the transmission mechanism from being subjected to excessive torque, there is provided an improved torque limiting control operatively connected to deenergize the work feeding motor on the occurrence of different predetermined degrees of load on the spindle driving motor at different spindle speeds. To this end, a control system operatively connected to adjust the variable speed transmission is coordinately operative to render the torque limiting control responsive to different predetermined degrees of load on the spindle driving motor in accordance with the power transmitting capacity of the transmission mechanism at the selected speed. In a modified form of the invention, there is provided a milling machine having a single main motor connected to drive both the tool spindle and the work supporting members. A clutch operable to transmit power from the single motor to the tool spindle and work supporting members is adapted to be actuated to disengaged power interrupting position in response to a modified form of an adjustable torque limiting control device.

The foregoing and other objects of the invention which will become more fully apparent from the following detailed description of apparatus exemplifying the invention, may be achieved by the milling machine described herein as a preferred embodiment thereof in connection with the accompanying drawings, in which:

Fig. 2 is a vertical longitudinal sectional view through the upper part of the horizontal spindle machine in Fig. 1, showing the spindle driving transmission mechanism;

Fig. 5 is a schematic electrical circuit diagram incorporating a variable torque limiting control device embodying the features of this invention;

Fig. 6 is an enlarged view in horizontal section taken through the knee and showing the power transmitting mechanisms and a part of the control mechanism for effecting operation of the knee elevating mechanism and for moving the table along its several lines of movement;

Fig. 7 is a schematic view of the power transmitting and distributing mechanism for effecting selective movement of the table along its several lines of movement;

Fig. 10 is a schematic hydraulic circuit diagram showing a portion of the unitary electro-hydraulic control system;

Fig. 11 is an enlarged detailed view showing the main starting valve in one of its positions of operation;

Fig. 12 is a schematic electric circuit diagram showing another portion of the combined unitary electro-hydraulic control system; and Fig. 13 is a fragmentary schematic electric circuit diagram showing a modified form of the combined electro-hydraulic control system.

Figure 1:
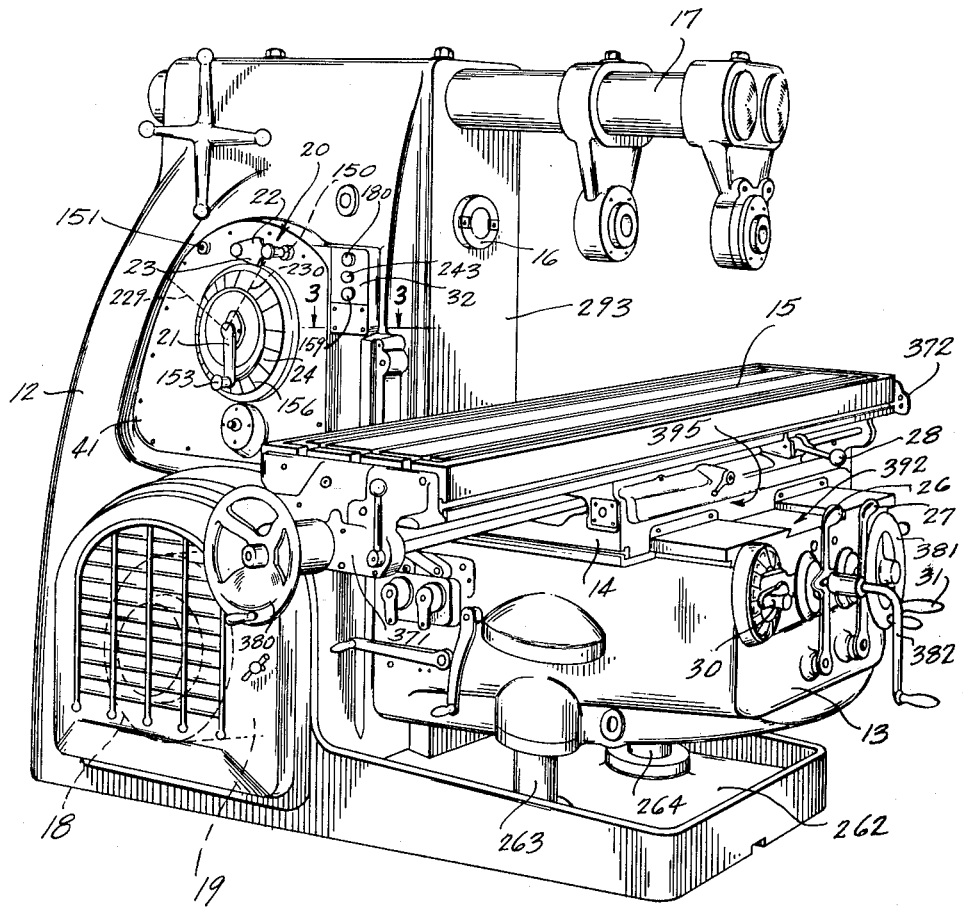
Figure 1 is a view in perspective depicting the left side of a horizontal spindle milling machine of the knee and column type incorporating a preferred form of the invention.

Referring more particularly to the drawings and especially to Fig. 1 thereof, the machine tool there shown as an example of apparatus constituting a preferred embodiment of the invention, is a milling machine of the well known horizontal spindle, knee and column type. As shown in Fig. 1 of the drawings, the milling machine structure comprises essentially an upstanding column 12 which serves to carry on its face a knee 13, saddle 14, and work supporting table 15 superimposed for selectively slidable movement in a plurality of mutually transverse planes. Near the top of the column 12 there is journalled the usual horizontally disposed tool supporting spindle 16 and above it are slidably mounted overarms 17 for supporting a cutter arbor (not shown) that may be mounted in the spindle 16 in well known manner to carry a cutter in cooperating relationship with a workpiece on the work supporting table 15.

Power for rotating the tool spindle 16 is derived from a relatively high powered motor 18 that is mounted in a motor compartment 19 formed within and extending transversely of the lower part of the column 12. The speed at which the spindle 16 is operated may be adjusted by means of a range change lever 20 and a speed selecting lever or crank 21 mounted on the left side of the column 12, the levers functioning cooperatively to shift speed changing gearing mounted within the column 12, directly above but separated from the motor compartment 19. The spindle speed is indicated by the coordinated positioning of a pair of range change indicating plates 22 and 23 associated with the range change lever 20, in cooperation with a speed indicating dial 24 that is connected to be turned by the crank 21.

As illustrated in Figs. 6 and 7, power for effecting movement of the vertically slidable knee 13, the transversely slidable saddle 14 and the longitudinally slidable table 15 is derived from a separate feed motor 25 mounted on the rightward side of the knee 13 and arranged to be operated coordinately with the relatively high powered spindle driving motor 18. In order to effect selective directional movement of the knee 13, saddle 14, and table 15, there are provided at the front of the machine, as shown in Fig. 1, directional shifting levers 26, 27 and 28 operatively connected to actuate reversing clutch mechanisms for transmitting power to drive the respectively movable members. To minimize lateral deflection of the knee 13 and provide maximum rigidity for the work supporting table 15 during a cutting operation, there is provided an improved elevating mechanism for the knee, and which is arranged to be actuated under control of the directional shifter lever 26.

For effecting selective feeding movement of the work supporting table 15 relative to the cutter spindle 16, there is provided on the front of the knee a feed rate selecting lever 30 connected to shiftably adjust a variable speed, feed transmission contained in a gear compartment formed within the knee 13. In order to effect movement of the knee 13, saddle 14 or table 15 at a fast or rapid traverse rate of speed, a rapid traverse lever 31 is connected to effect energization of the feed motor 25 and simultaneously therewith to actuate clutching mechanism to effect transmission of power to drive each of the reversing mechanisms respectively engageable on movement of the feed directional levers 26, 27 and 28.

For effecting coordinated energization of the spindle driving motor 18 and the feed motor 25, a control station 32 mounted on the left side of the column is provided with controlling means for coordinately starting or stopping the spindle motor 18 and the feed motor 25, as well as inching control means arranged to effect a momentary energization of the spindle driving motor, as will hereinafter be more fully explained.

Referring now to Fig. 2 of the drawings, power for rotating the spindle 16 is transmitted from the main drive motor 18 in the motor compartment 19 by means of multiple belts 33 that pass over a pulley 34. The pulley 34, in turn, is journalled to rotate on the side of the machine column and is connected to transmit power to a shaft (not shown) which extends into the column and has integrally formed with it a driving bevel gear 36. The driving bevel gear 36 transmits driving power to a meshing driven bevel gear 37 which is journalled to rotate on one end of a shaft 38.

The shaft 38 is rotatably journalled in a speed box 39 which extends within a gear compartment above the motor compartment in the column through an opening in the left side thereof. As shown in Fig. 1, a cover plate or control panel 41 supports the speed box 39 within the column opening and carries the range change lever 20 and the speed selecting crank 21, as well as the range change indicating plates 22 and 23 and the speed indicating dial 24 respectively associated therewith for indicating the selected driving speed of the spindle 16.

Referring again to Fig. 2, the driven bevel gear 37 is integrally formed with an elongated spur pinion 45 which meshes with one gear 46 of a couplet 47 that is slidably mounted for selective longitudinal movement on a short splined shaft 48 parallelly journalled in the speed box 39. The splined shaft 48, together with the gear couplet 47 and a second gear couplet 49 slidably carried by the shaft for longitudinal shifting movement, constitute elements of a speed changing device A forming one part of the speed changing transmission mechanism. The couplet 47 comprises the gear 46 and a gear 50 joined together and disposed to be selectively meshed alternatively with cooperating idler gears 51 and 52, respectively, rotatably journalled on an idler shaft 53 that is fixedly mounted within the speed box 39 above and parallel to the rotatably journalled splined shaft 48. The second couplet 49 slidably mounted on the splined shaft 48, comprises a gear 55 and a gear 56 joined together and disposed to be selectively meshed alternatively with a gear 57 and a gear 58, respectively, also journalled on the shaft 53. The four idler gears 51, 52, 57, and 58 together with a gear 59 journalled on the stationary shaft 53, are secured together in manner to rotate as one unitary intermediate idler cluster 60 of the speed changing device A. The two couplets on the shaft 48 constituting the primary element of the speed changing device A may be shifted to engage each of the four gears in turn with its complementary idler gear on the shaft 53 to drive all of the idler gears constituting the idler cluster 60 at any one of four different rates of speed.

Above the stationary shaft 53 and disposed parallel to it is a longer shaft 62 that is journalled directly in the column 12 and that, in turn, has rotatably journalled on its central portion 63 an externally splined sleeve 64. Slidably mounted on the splined sleeve 64 are shiftable gears 65 and 66 which are selectively slidable to mesh with the idler gears 52 and 59, respectively, which form parts of the intermediate idler cluster 60. The sliding gears 65 and 66 constitute a secondary element of the speed changing mechanism A and may be selectively positioned to transmit driving power from the intermediate idler cluster 60 to the splined sleeve 64 at either of two speed ratios.

Since the primary element of the variable speed device A, constituted by the couplets 47 and 49, is capable of four different speed rates and the secondary element, constituted by the gears 65 and 66, is capable of two speed rates, it is evident that the splined sleeve 64 may be driven at any one of eight speeds. This is accomplished by suitably engaging different ones of the sliding gears in the primary and secondary elements with their cooperating idler gears constituting the intermediate speed transmitting idler cluster 60. As indicated in Fig. 2, the gears are shown in position to drive the splined sleeve 64 at the lowest speed rate of the eight speeds available through the speed changing device A with the large gear 66 of the secondary element engaging the small idler gear 59 and the small gear 56 of the primary element engaging the large idler gear 58. The speed selecting crank 21 and the indicating dial 24, Fig. 1, are movable to a plurality of positions providing for an operating condition within the speed changing transmission device A in which a selected one of the gears of the primary element and a selected gear of the secondary element are in mesh with cooperating gears of the intermediate idler cluster 60 rotatably journalled on the shaft 53.

From the externally splined sleeve 64 rotatably journalled on the shaft 62, power is transmitted through an intermediate range changing mechanism B to drive the rotatably journalled shaft 62 in a selected one of two speed rate series. Power is then transmitted from the shaft 62 through a final range changing mechanism C which functions to deliver power to the tool spindle 16 in a high or a low operating range alternatively. The intermediate range changer B and the range changer C are positionable in a plurality of shiftably adjusted positions and are so proportioned as to provide three distinct operating ranges including a low, intermediate and high range in such manner that the full compass of the speed changing device A may be utilized in each of the three ranges without overlapping or discontinuity between the ranges.

A gear 71 rotatably journalled on the central portion of the shaft 62 is secured to the splined sleeve 64 in manner to transmit driving power therefrom to a meshing gear 72 secured to a jack shaft 73 rotatably journalled in the column 12 in parallel relationship with the shaft 62 and constituting an element of the intermediate range changing mechanism B is constituted by a gear 74 which is slidably mounted on a splined rearward portion of the shaft 62 for selective longitudinal shifting movement thereon. As shown in Fig. 2, the gear 74 has been shiftably positioned to engage a complementary gear 75 secured to the jack shaft 73 in manner to transmit driving power from the gear 71, through the gear 72 and the jack shaft 73 to drive the spindle driving shaft 62 in an extremely low range of speeds. For driving the shaft 62 in a higher speed range, the gear 74 may be moved rightwardly in manner that an internal gear 76 former therein directly engages the teeth of the gear 71 in the manner of a clutch.

From the shaft 62, power is transmitted through a gear couplet 78 slidably splined on the rightward end 79 of the shaft 62 and constituting the final range changing mechanism C which is arranged to drive the tool spindle 16 in a high or a low range of operating speeds. The couplet 78 comprises a small gear 80 and a large gear 81 joined together and mounted for longitudinal sliding movement on the shaft 62 into meshing engagement alternatively with a low range driving gear 83 or a high range driving gear 84, respectively, which are splined directly to the spindle 16.

As hereinbefore mentioned, the gears of the intermediate range changer B and the range changer C are positionable in a plurality of positions for transmitting driving power from the splined sleeve 64 to rotate the spindle 16 at any one of three distinct speed ranges including a low, intermediate and a high range. To drive the spindle 16 through the lowest range of operating speeds, the range changers B and C are positioned as shown in Fig. 2, with the gear 74 engaging its complementary driving gear 75 and the gear 80 of the couplet 78 engaging its complementary low range spindle driving gear 83. For driving the spindle 16 through an intermediate range of speeds, the gear 80 of the couplet 78 is retained in meshing engagement with the low range spindle drive gear 83 and the gear 74 is shifted rightwardly in a manner that the internal gear 76 formed therein engages the complementary gear 71 thereby locking the sleeve 64 to the shaft 62. Thus, in the low and intermediate ranges constituting the lowest sixteen speeds, driving power is transmitted from the small spindle driving gear 80 to the large spindle driving gear 83. To drive the spindle 16 at the high range of operating speeds, the gear 74 is retained in its rightwardly shifted position in clutching engagement with the driving gear 71 and the couplet 78 is shifted leftwardly in manner that the gear 81 is in meshing engagement with the high range spindle driving gear 84. The large gear 83 has the effect of a flywheel and tends to reduce to a minimum minor fluctuations in cutter speed which might occur as the individual teeth of a cutter engage a workpiece.

The speed changing device A functions to provide a series of eight different driving ratios in step by step arrangement within each of the three distinct speed ranges effected by the combined positioning of the range changers B and C and including a low, intermediate and high speed range so proportioned as to provide progressive steps without overlapping or discontinuity between the ranges. By this combination of the speed changing device A with the intermediate speed range changer B and the range changer C, it is possible to predeterminately position the shiftable gearing contained therein for operating the tool spindle 16 at any one of twenty-four speeds arranged in approximate geometrical progression.

A primary advantage of this invention is the provision of a compactly arranged variable speed transmission having operating characteristics that provide for transmitting the full power of the relatively high powered driving motor to drive the tool spindle with a higher degree of torque than has heretofore been practicable, for faster removal of metal at the high speed rates. In addition to this, the transmission is so arranged as to be selectively adjustable through a wide range of spindle driving speeds extending downwardly through a series of extremely low operating speeds in manner to increase the operational flexibility of the machine for performing the largest possible variety of cutting operations. The transmission is necessarily limited in its power transmitting capacity at the lowest output speeds because of the limitations imposed by the overall size and capacity of the machine, the extremely high powered spindle driving motor and the variations in torque on the various rotatable members of any shiftably geared transmission which occur as the output speed thereof is selectively adjusted through its complete range of allowable speeds. In normal machine operation however, this reduced power transmitting capacity of the variable speed transmission at the lowest output speeds is still fully adequate to drive the cutter spindle for performing cutting operations on a class of work within the range of the machine. Although incorporating this arrangement for widening the allowable range of output speeds greatly increases the operational flexibility of the machine, it is necessary to protect the transmission mechanism against excessive torque when adjusted to drive the tool spindle at the lowest driving speeds. To this end there is provided an improved automatic torque limiting control arranged to deenergize the work feeding motor on the occurrence of a predetermined degree of load on the spindle driving motor, that exceeds the torque transmitting capacity of the transmission at the selected speed.

Referring again to Fig. 2, the improved variable speed transmission mechanism there shown, is arranged to have sufficient torque transmitting capacity to transmit the full power of the relatively high-powered spindle driving motor 18 whenever the transmission is adjusted to drive the tool spindle 16 at a selected speed in either the high, the intermediate or portions of the low speed range. When the transmission is adjusted to drive the spindle 16 within the lowest range of operating speeds however, it will be apparent that the mechanical advantage effected by engaging the intermediate range change gear 74 with the low speed driving gear 75 will greatly increase the torque on the low speed driving gear 80 and its meshing spindle gear 83 if the full power of the motor were applied at the lowest driving speeds. With the gear 74 engaging the gear 75 to drive the spindle 16 through the lowest operating range, the greatest mechanical advantage, and, consequently, the highest torque on the spindle driving gears would occur during the lowest of the eight stepped driving ratios obtainable by selectively shifting the gearing in the speed changing device A. As a result of the increased mechanical advantage on the spindle driving gears 80 and 83, the power transmitting capacity of the entire variable speed transmission mechanism is greatly reduced in the lowest of the eight stepped speed ratios available in the low range.

In accordance with this invention, there is provided an improved torque limiting control arranged to deenergize the work feeding motor on the occurrence of a predetermined degree of load on the spindle driving motor, thus stopping continued work feeding movement of the table to relieve an overload condition on the spindle driving transmission at any selected output speed. The torque limiting control comprises a pair of instantaneous overload control relays which are predeterminately adjusted and individually connectable to be actuated on the occurrence of different predetermined degrees of load on the spindle driving motor. One of the torque limiting control relays is arranged to be responsive to overload conditions exceeding the rated capacity of the spindle driving motor and is rendered operative whenever the transmission mechanism is adjusted to drive the tool spindle at one or another of the nineteen highest operating speeds. This relay functions primarily to protect the transmission against transmitting excessive torque when the transmission is operative to transmit the full power capacity of the motor. Secondarily, this relay functions to protect the spindle driving motor against sudden or shock overloads. The other of the instantaneous overload control relays is responsive to overload conditions which exceed the torque transmitting capacity of the transmission mechanism when operating at greatest mechanical advantage at the lowest driving speeds and is rendered operative whenever the transmission is selectively adjusted to drive the tool spindle at one or another of the five lowest operating speeds. To selectively control the relays constituting the torque limiting control device, the speed selecting crank 21 shown in Fig. 1, is operatively connected to render one or the other of the relays operative, depending on whether the crank 21 has been moved to adjust the variable speed transmission mechanism for driving the tool spindle in the five lowest or in the nineteen highest of the twenty-four available operating speeds.

Thus, in the event any overload exceeding the torque transmitting capacity of the transmission occurs as a workpiece mounted on the table 15 is fed to a cutter mounted on the spindle 16, the torque limiting control will be operative through the appropriate relay to deenergize the work feeding motor 25. The resultant cessation of feeding movement of the work table will relieve the excessive torque on the variable speed transmission mechanism regardless of whether the transmission is operating at either its reduced power transmitting capacity or at its full power capacity. The spindle motor can then rotate freely until the overload condition has been corrected, at which time the feeding motor can be restarted to resume feeding movement of the work supporting table 15.

The control mechanism for shifting the various sliding gear couplets and gears to effect the changes in the spindle driving ratio is similar to that disclosed in U.S. Patent No. 2,240,973 dated May 6, 1941. This mechanism includes a cam actuated gear shifting apparatus (not shown) constituting a mechanical linkage arranged to be directly operated by the speed selecting crank 21 and functioning to positively shift the sliding gears of the variable speed device A, Fig. 2, in such manner that the eight speeds of the series may be effected in predetermined order. One complete revolution of the crank 21 is required for each gear shifting movement of the speed changing device A or a total of eight revolutions of the crank are required to effect a complete transit of the eight stepped driving ratios available therethrough. In order to obtain the complete series of twenty-four spindle driving speeds available with the combined coordinated positioning of the speed changing device A and the range changers B and C, a total of twenty-four revolutions of the crank 21 are required. Coordinately with the three repetitive series of shifting movements of the speed changing device A, the crank 21 is operatively connected to effect a coordinated shifting movement of the intermediate range changing mechanism B. The shifting mechanism operative on movement of the crank 21, is so arranged that the gears are shifted in manner to avoid possibility of locking the mechanism by engaging more than one gear on the primary shaft 48 or more than one gear on the secondary element 64 with a cooperating gear of the idler cluster 60, and in manner that the intermediate range change gear 74 is in its low range driving position during the first of the three repetitive series of shifting movement of the speed changer A, while for the last two series of shifting movements of the speed changer A, the gear 74 is retained in its high range driving position.

In order to obtain the three driving ranges required for the complete series of twenty-four spindle driving speeds available, the range change lever 20 is so positioned that the low range gear 80 meshes with the spindle driving gear 83 during the first sixteen revolutions of the crank 21. For the last eight revolutions of the crank 21, the lever 20 is shifted to effect meshing engagement of the high range gear 81 with the spindle driving gear 84. For positioning the range change lever after it has been turned to shift the gearing, the lever 20, Figs. 1 and 5, is provided with an operating knob 149 and latching device constituted by a spring pressed latching plunger (not shown) that is adapted to enter locating holes 150 and 151 formed in the control panel 41 and securing the lever 20 in a low or high range operating position respectively.

In a similar manner, for retaining the speed selecting crank 21 in a predetermined coordinated position of adjustment with the range change lever 20, the crank 21 likewise is provided with an operating knob 153 and latching device constituted by a spring pressed latching plunger that is adapted to enter a locating hole formed in a stationary member constituting part of the control panel 41.

The speed indicating device or dial 24 is mounted for rotation in the control panel 41 concentrically with the speed selecting crank 21 and carries a continuous circular indicating scale constituted by speed indicia 156 arranged in approximate geometrical progression. Each turn of crank 21 effects an incremental advancement of the dial 24 carresponding to one of the twenty-four speed indicia 156 into which the continuous circular indicating scale carried thereby is divided.

For determining the selected spindle operating speed effected by a combined positioning of the range change lever 20 and the speed selecting crank 21, the speed indicating dial 24 is arranged to cooperate with either of the diametrically opposed indicating plates 22 or 23 formed on the hub of the lever 20. The range change plate 23 indicating the low range position of the lever 20 is preferably colored to conform to the color of the speed indicia divisions on the dial 24 indicating the lower sixteen spindle operating speeds. The plate 22 indicating the leftwardly shifted or high range position of the range change lever 20 is colored to conform to the divisions on the dial 24 indicating the eight highest spindle operating speeds.

A schematic representation of an electric circuit arranged to coordinately control the spindle driving motor 18 and the work feeding motor 25 is shown in Fig. 5. Electrical energy for operating the motors is derived from the conductors $L_1$, $L_2$ and $L_3$ which are connected to a source of power by a disconnecting switch 173 in the usual manner. In order to operate the motors, it is necessary to energize a low voltage control circuit contained in a control cabinet 174 which receives electrical energy through a transformer (not shown) mounted in the cabinet and connected by conductors 176 and 177 to two of the main supply lines $L_1$ and $L_3$ in the usual manner. The control circuit within the cabinet 174 is generally similar to the control circuit shown in U.S. Patent No. 2,497,842, Serial No. 519,366 and is selectively actuatable to energize a feed motor control circuit represented by light lines in the drawings.

The control circuit in the cabinet 174 may be energized or deenergized selectively by depressing a master switch start button 178 or a master switch stop button 179, respectively.

In order to energize the spindle motor 18 for either clockwise or counterclockwise rotation, a selectively positionable reverser lever 180 is operatively connected to position a forward or reverse switch interconnected in the control circuit within the control cabinet 174, as more fully described in the aforementioned Patent No. 2,497,842.

With the reverser lever 180 positioned to provide forward rotation of the spindle motor 18 and the master switch start button 178 depressed to energize the control circuit, the spindle motor 18 may be energized by depressing a start button 181 carried by the control station 32. The start button 181 is operatively connected to energize a star-delta stepping circuit, interconnected in the control circuit, which operates to provide a gradual or stepped acceleration of the spindle motor 18 in well known manner. Power for driving the spindle motor 18 is derived from the main supply lines $L_1$, $L_2$ and $L_3$ through conductors 182, 183 and 184 connecting with the star-delta stepping circuit in the control cabinet 174. From the control cabinet, groups of conductors 185, 186, 187, 188, 189 and 190 are so interconnected between the star-delta stepping circuit and the main drive motor 18 as to effect energization of the motor 18 for rotation at an intermediate starting speed and after a predetermined time interval, at full operating speed. A pair of solenoidal coils respectively associated with a pair of instantaneous overload relays 191 and 192 are operatively interconnected in the motor circuit by means of the conductor 185 for actuation on different predetermined degrees of load on the spindle driving motor 18. As will hereinafter be explained, the overload relays 191 and 192 are alternatively operable to deenergize the feed motor 25 on the occurrence of different degrees of load on the spindle motor 18.

After the spindle motor 18 has reached full operating speed, the feed motor 25 may be energized by again depressing the start button 181 to energize a feed motor control circuit represented by light lines in the drawings. The control circuit in the control cabinet 174 is so arranged that the feed motor 25 cannot be energized until the spindle motor 18 has reached its full operating speed. Depressing the start button 181 a second time then effects a flow of control current from the circuit in the control cabinet 174 through a conductor 193 and a contact plate 194 of a normally closed thermal overload relay 195 associated with the spindle motor 18. From the contact plate 194, the current flow continues through a conductor 196 and a contact plate 197 of a second normally closed thermal overload relay 198 for the spindle motor, to a conductor 199. A contact plate 204 of a normally closed thermal overload relay 205 associated with the feed motor 25 transmits current from the conductor 199 to a conductor 206 connecting with a contact plate 207 of another normally closed thermal overload relay 208 associated with the feed motor. From the contact plate 207, the current is transmitted by a conductor 209 to energize a solenoid coil 210 that actuates a starting relay 211 for the feed motor 25. Movement of the feed motor starting relay 211 to its upward closed position effects an operative connection from the main supply lines $L_1$, $L_2$ and $L_3$, through, respectively, closed contact plates 213, 214 and 215 to conductors 216, 217 and 218 for energizing the feed motor 25.

The return line from the solenoid coil 210 of the feed motor relay is completed through a conductor 219, and a conductor 220 connecting with a normally closed contact plate 221 of the instantaneous overload control relay 192 associated with the spindle motor 18. From the contact plate 221, the current continues through a conductor 223, a normally closed contact plate 224 of the instantaneous relay 191 associated with the spindle motor, a conductor 226, and a conductor 227 constituting the return line connecting with the control circuit in the control cabinet 174.

In the event of a gradually increasing sustained overload on either the spindle motor 18 or the feed motor 25, one or another of the thermal overload relays 195, 198, 205 or 208 respectively associated therewith will be actuated to an open position effecting an interruption in the flow of current to the solenoid coil 210 of the feed motor relay 211. Deenergization of the coil 210 in turn will permit the relay 211 to drop to an open position effecting an interruption in the flow of current from the main supply lines $L_1$, $L_2$ and $L_3$ to the feed motor 25. With the feed motor deenergized, feeding movement of the work supporting table will be stopped while permitting free rotation of the spindle motor 18 to correct the overload condition.

In accordance with this invention, as hereinbefore mentioned, there is provided an improved torque limiting control disposed to protect the variable speed transmission mechanism constituted by the speed changing device A, the range changer B and the range changer C, Fig. 2, against varying degrees of torque which exceed the graduated power transmitting capacity thereof. The torque limiting control is constituted in part by the instantaneous overload control relays 191 and 192 which are predeterminately adjusted and individually connectable to deenergize the work feeding motor 25 on the occurrence of different predetermined degrees of load on the spindle motor 18. Thus, in performing a cutting operation, an overload condition exceeding the predetermined safe torque transmitting capacity of the transmission might occur, for example, as a cutter mounted on the spindle 16 came in cutting engagement with a hard spot on a workpiece carried by the table 15. One or the other of the relays 191 and 192 would then be actuated to effect deenergization of the feeding motor with a resultant cessation in feeding movement of the table 15. The spindle can then rotate freely, relieving the excessive torque on the transmission mechanism until the adjustments necessary to prevent a reoccurrence of the overload condition is effected, at which time the feeding motor 25 can be restarted to resume the feeding operation. The speed selecting crank 21, Figs. 1 and 5, is operative to effect a selective connection of one or the other of the instantaneous relays 191 and 192 for alternative operation depending on the power transmitting capacity of the transmission, as determined by the selected output speed resulting from the coordinated positioning of the speed selecting crank 21 and the range change lever 20.

The instantaneous overload control relay 192 is predeterminately adjusted to be actuated to an open position on the occurrence of a degree of load on the spindle motor 18 which is approximately one-half the rated capacity thereof. Since the relay 192 is connected in series with the relay 191 in the return line from the solenoid coil 210 of the feed motor relay 211 through the conductors 219, 220 and 223; opening of either the relay 191 or the relay 192 will interrupt the flow of current to the coil 210 to effect deenergization of the feed motor 25. The instantaneous overload relay 192 is operatively connected in the return line from the feed motor relay coil 210 whenever the speed change crank 21 and the range change lever 20 are coordinately adjusted to drive the spindle 16 at any of the five lowest operating speeds, as indicated by the sector of the speed indicating dial between the dotted lines 229 and 230 in Figs. 1 and 5.

The instantaneous overload control relay 191 is predeterminately adjusted to be actuated to an open position on the occurrence of a degree of load on the spindle motor 18 which is approximately equivalent to the rated capacity thereof. Whenever the speed selecting crank 21 is positioned to effect an adjustment of the variable speed transmission mechanism for driving the spindle 16 at one or the other of the highest nineteen operating speeds, only the relay 191 is operatively connected to effect deenergization of the feeding motor 25.

Figure 3:
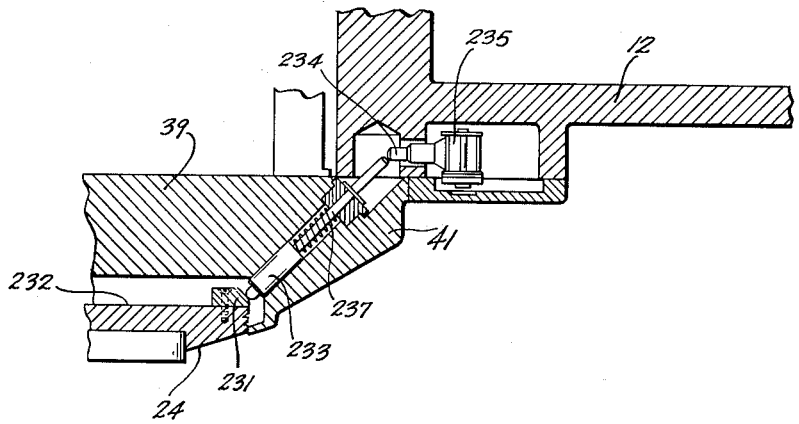
Fig. 3 is an enlarged fragmentary detail view in horizontal section taken on the line 3—3 of Fig. 1 and showing the cam actuated switching mechanism for the variable torque limiting control device.

In order to effect an alternative connection of either the torque limiting control relay 191 or the relay 192 for deenergizing the feeding motor 25, there is provided an arcuately formed cam 231 secured to the inner face 232 of the rotatably mounted speed indicating dial 24 adjacent to the outer periphery thereof as indicated in Figs. 3 and 5. As schematically represented in Fig. 5, the cam 231 is rotatable with the dial 24 in manner to retain an axially slidable actuating plunger 233 carried by the control panel 41 in its outwardly urged position as the speed changing crank 21 is rotated to drive the spindle 16 at any one of the five lowest operating speeds indicated by the sector between the dotted lines 229 and 230. The plunger 233, in turn, operates to retain an actuating plunger 234 of a normally closed switch 235 in a depressed position in a manner that the normally closed contact plate 236 therein is in its open or disconnected position. During this condition of operation, the instantaneous overload relay 192 is operative to deenergize the feed motor 25 on the occurrence of a load exceeding approximately one-half the rated capacity of the spindle motor 18.

As the crank 21 is rotated to drive the spindle 16 at any selected speed other than the lowest five speeds indicated by the sector between the dotted lines 229 and 230, the cam 231 carried by the speed indicating dial 24 will be rotated out of engagement with the actuating plunger 233. The plunger 233 will then be urged inwardly by the resilient action of a spring 237, allowing the contact plate 236 to return to its normally closed position bridging the contacts or terminals 238 and 239 contained therein to complete a shunt circuit around the contact bar 221 of the relay 192.

With the contact plate 236 of the switch 235 in closed position, only the instantaneous relay 191 will be operative to deenergize the feed motor 25 on the occurrence of a degree of load on the spindle motor 18 which is approximately equivalent to the rated capacity thereof. The return line from the solenoid coil 210 is then completed through the conductors 219 and 220 to a shunt conductor 241 connecting with the terminal 238 of the switch 235. Current flow then continues through the closed contact plate 236 of the switch 235 and through a conductor 242 to the conductor 223 which, in turn, connects with the normally closed contact plate 224 of the instantaneous control relay 191, thereby maintaining the circuit regardless of whether the relay 192 is closed or open. By means of this arrangement, therefore, the arcuate cam 231, the plunger 233, and the switch 235 constitute, in effect, an adjustment means for regulating the operation of the adjustable torque limiting control including the instantaneous overload control relays 191 and 192 as completely described hereinbefore.

For effecting a coordinated deenergization of the spindle motor 18 and the feeding motor 25 as well as for effecting a quick stopping of the spindle motor 18, the control station 32 is provided with a stop button 243. The stop button 243 is connected to effect a sequential operation of a plurality of switches in a manner that a slight inward pressure thereon will effect deenergization of the motors and a further continued inward pressure will operate in conjunction with a zero speed plugging switch for effecting a quick stopping of the spindle motor 18 by plugging action.

It will be apparent to those skilled in the art that other types of suitable driving means may be substituted for the motor 18 and may be arranged in a similar manner to transmit power through the variable speed transmission mechanism for rotating the spindle 16 at selected speed, and to actuate either of the instantaneous overload control relays 191 or 192 selectively for deenergizing the feeding motor 25 to protect the transmission against excessively high torque at any of the available output speeds. In the fragmentary electrical circuit diagram in Fig. 4, which may be substituted for the lower part of the diagram in Fig. 5, there is shown a modification of the invention incorporating a spindle driving motor 246 disposed to be operatively energized through the usual three wire connection constituted by the conductors 247, 248 and 249 in well known manner.

Figure 4:
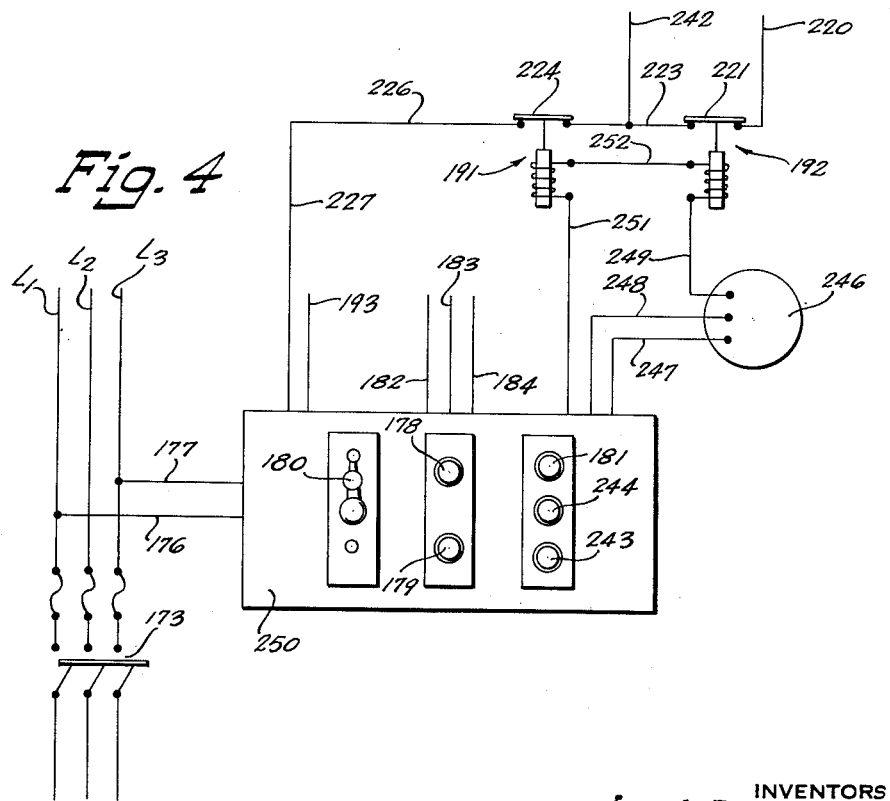
Fig. 4 is a fragmentary schematic circuit diagram illustrating a modification of the circuit diagram shown in Fig. 5.

As schematically represented by the modified circuit diagram shown in Fig. 4, taken in conjunction with the diagram shown in Fig. 5, electrical energy for operating both the feeding motor 25 and the spindle motor 246 is derived from the line conductors $L_1$, $L_2$ and $L_3$. To operate the motors, it is necessary to energize a low voltage control circuit contained in a control cabinet 250 which receives electrical energy through a transformer (not shown) in the cabinet connected by the conductors 176 and 177 to the main supply lines $L_1$ and $L_3$. The control circuit in the cabinet 250 is generally similar to the control circuit contained in the cabinet 174 and may be energized or deenergized by depressing the master switch start button 178 or the master switch stop button 179, respectively.

With the master switch start button 178 depressed to energize the control circuit, the spindle motor 246 and the feeding motor 25 may be coordinately energized by depressing the start button 181 which, in turn, is connected to actuate a holding circuit interconnected in the control circuit for operating the motors. Power for operating the spindle motor 246 is derived from the main supply lines $L_1$, $L_2$ and $L_3$ through the conductors 182, 183 and 184, as shown in Fig. 5, connecting through the holding circuit in the control cabinet 250, Fig. 4, with the conductors 247 and 248 and a conductor 251, respectively. As shown in Fig. 4, the conductors 247 and 248 are connected directly to the spindle motor 246, and the conductor 251 is connected through the solenoid coil of the instantaneous overload relay 191 to a conductor 252. The conductor 252, in turn, is connected through the solenoid coil of the instantaneous overload relay 192 to the conductor 249 connecting with the spindle motor 246.

To effect a coordinated energization of the feeding motor 25, current flows from the control circuit in the control cabinet 250 through the conductor 193 and, as shown in Fig. 5, through the contact plates of the thermal overload relays 195, 198, 205 and 208, respectively, to a conductor 209 connecting with the solenoid coil 210 of the feed motor relay 211.

As hereinbefore mentioned, the circuit through which the current will flow in a return line from the solenoid coil 210 of the feed motor relay 211 is determined by the adjusted position of the speed selecting crank 21 and the resultant positioning of the contact plate 236 of the normally closed switch 235. With the crank 21 positioned to adjust the variable speed transmission for driving the tool spindle 16 at one or another of the five lowest operating speeds, as indicated by the sector of the speed indicating dial between the dotted lines 229 and 230, the return flow of current from the coil 210 will continue through the conductor 219 and the conductor 220 to the contact plate 221 of the instantaneous relay 192. From the contact plate 221, the current flow will continue through the conductor 223, the contact plate 224 of the relay 191, and the conductors 226 and 227 to the feed motor holding circuit in the control cabinet 250.

With the crank 21 positioned to adjust the variable speed transmission for driving the spindle 16 at one or another of the nineteen highest operating speeds, the contact plate 236 of the switch 235 will be resiliently urged to a closed position bridging the contacts 238 and 239 as the cam 231 is rotated out of engagement with the actuating plunger 233. The return flow of current from the solenoid coil 210 will then continue through the conductors 219 and 220 to the shunt conductor 241 connecting with the contact 238. With the contact plate 236 of the switch 235 in closed position, the current then continues through a conductor 242 to the conductor 223 connecting with the normally closed contact plate 224 of the instantaneous overload control relay 191.

Thus, in the event of the occurrence of a predetermined degree of load on the spindle motor 246 that exceeds the predetermined safe power transmitting capacity of the variable speed transmission mechanism at a selected rate of output speed, one or the other of the instantaneous overload control relays 191 or 192 will be actuated to effect deenergization of the feeding motor 25.

The knee 13 is vertically adjustable by means of an improved elevating mechanism comprising essentially two spaced apart vertically upstanding parallelly disposed elevating screws 260 and 261 interposed between the knee 13 and a forwardly extending base section 262 of the column 12 and respectively contained within a pair of telescoping protective housings 263 and 264, as shown in Figs. 1 and 6. Each of the elevating screws 260 and 261 is nonrotatably secured to the column base 262 and is helically threaded for engagement with one of a pair of complementary internally threaded nuts 265 and 266 respectively journalled in the knee 13.

For effecting a coordinated and equalized vertical adjustment of the knee 13, it is necessary that the internally threaded elevating screw nuts 265 and 266 be rotated in synchronism relative to their cooperating nonrotatable elevating screws 260 and 261, respectively. To this end, as shown in Fig. 6, spur gears 295 and 296 respectively keyed to the rotatable nuts 265 and 266 are disposed to simultaneously meshingly engage a third spur gear 297 operatively interposed therebetween and which is rotatably journalled within the knee. To effect rotation of the elevating screw nuts 265 and 266, a pair of bevel pinions 302 and 303 are keyed to the rotatable nuts 265 and 266, respectively, and are disposed to be actuated respectively by manual means or by power driven means at a selected rate of speed.

Power for driving the vertically slidable knee 13, the transversely slidable saddle 14 and the longitudinally slidable table 15 at a selected feeding rate or at a rapid traverse rate of speed is derived from the feeding motor 25 located at the rightward rear side of the knee 13, as shown in Fig. 6. From the feed motor 25, as schematically shown in Fig. 7, power is transmitted through a shaft 307 to drive a worm 308 secured thereto and which is in meshing engagement with a wormwheel 309. The wormwheel 309 is disposed to rotate a shaft 310 to transmit power to drive a pair of spur gear pinions 311 and 312 respectively secured thereto at a constant rate of speed. The gear pinion 311 is in meshing engagement with a complementary gear pinion 315 secured to a shaft 316 to constitute a constant speed source of power which is selectively connectable to drive the major slidably movable members including the knee, saddle and table at a fast or rapid traverse rate of speed by means of a selectively actuatable clutching mechanism 317. The other spur gear pinion 312 is disposed to mesh with a complementary gear pinion 318 secured to a shaft 319 connected to drive a variable speed transmission mechanism 320 which is suitably located within the central portion of the knee 13. Although the transmission mechanism 320 may be of any variable speed type, it is preferably of the shiftable gear type generally similar to the feed driving transmisison mechanism shown in Patent No. 2,182,421. As hereinbefore explained, the feed selecting lever 30 at the front of the knee 13, shown in Fig. 1, is connected to adjust the variable speed transmission mechanism 320 for driving the knee 13, the saddle 14, and the table 15 at a selected work feeding rate of speed.

Power for movement of the work supporting table 15 relative to the tool spindle 16 in any of its three lines of movement is transmitted through an output shaft 321 operatively driven by the variable speed feed driving transmission mechanism 320 at a rate determined by the setting of the rate selecting lever 30 to three independely operating branches, each including an independent reversing mechanism, by means of a gear 322 disposed to be driven by the shaft 321 and constituting a common driving member. A rollover clutch mechanism 323 interposed between the output shaft 321 and the driving gear 322 is operative in well known manner to transmit power therebetween for driving the gear 322 at a selected work feeding rate whenever the gear 322 is not already being driven at a faster rate of speed. As schematically shown in Fig. 7, the gear 322 meshes with a gear 326 carried on a shaft 327 which is journalled for rotation in the forward part of the knee 13 and is disposed to carry a second similarly shaped gear 328. The gear 326 meshes with a wide faced gear 329 which is rotatably journalled on a cross traversing shaft 330 journalled for rotation in the forward part of the knee by means of bearings 331, 332 and 333, as shown in Figs. 6 and 7. The other gear 328 carried for rotation by the shaft 327 is disposed to mesh with a wide faced gear 334 which is rotatably mounted on a shaft 335 journalled in the knee in parallelism with the cross traversing shaft 330 to constitute part of a reversing mechanism 336 for rotatably driving the elevating screw nuts 265 and 266.

To provide for effecting reversal in the direction of rotation of the cross traversing shaft 330 and the knee reversing mechanism 336, the wide faced gear 334 is disposed to mesh with a gear 337 rotatably journalled on the shaft 330, and the wide faced gear 329 is disposed to mesh with a gear 338 keyed to the shaft 335 for rotation therewith. By this arrangement, the gears 329 and 337 are caused to rotate in opposite directions on the cross traversing shaft 330. In like manner, the gear 338 keyed to the shaft 335, as well as the gear 334 rotatably journalled thereon, are caused to rotate in opposite directions, the shaft 335 being rotatable only in the same direction as the gear 338.

As shown in Figs. 6 and 7, the cross traversing shaft 330 is provided with a shiftable clutch sleeve 339 that is splined thereon between the oppositely rotating gears 329 and 337 and that is provided at each end with clutch teeth disposed to cooperate with complementary clutch teeth of the gears 329 and 337. The clutch sleeve 339 is shiftable to selectively connect either the gear 329 or the gear 337 to drive the cross traversing shaft 330 in either direction of rotation. The cross traversing shaft 330 is provided toward its inner end with helical threads 340 disposed to engage a cooperating nut 343 secured to a bracket 344 depending from the underside of the saddle 14. The nut 343 and the helically threaded cross traversing shaft 330 journalled in the knee 13 are arranged to cooperate to effect movement of the saddle 14 and the table 15 slidably carried thereby toward or away from the front face of the column 12 depending upon the direction of rotation of the threaded shaft 330, as determined by the shiftably adjusted position of the clutch sleeve 339.

Between the oppositely rotating gears 334 and 338 which are respectively journalled on and keyed to the shaft 335 to constitute the knee reversing mechanism 336, there is provided a slidable clutch sleeve or clutch gear 345 which is journalled on the shaft 335 for rotation independently thereof and which carries a gear pinion 346 disposed to have slidable meshing engagement with a wide faced gear 347 secured to an elevating shaft 348.

As shown in Figs. 6 and 7, the elevating shaft 348 is journalled toward the rightward side of the knee in parallelism with the cross traversing shaft 330 and the gear 347 is disposed to transmit power for rotating the shaft 348 by means of a safety clutch mechanism 349 interposed therebetween. The clutch sleeve 345 is provided at its opposite ends with clutch teeth disposed to engage complementary clutch teeth formed on the adjacent faces of the reversedly rotating gears 334 and 338. Shiftable adjustment of the sleeve 345 into clutching engagement with the gear 334 or the gear 338 will effect power driven movement of the gear 346 in a selected direction of rotation. Since the gear 346 is slidably engageable with the wide faced gear 347 regardless of the shiftably adjusted position of the clutch sleeve 345, power will be transmitted therebetween to rotate the elevating shaft 348 in the one or the other direction selectively. The elevating shaft 348 carries at its forward end, as shown in Figs. 6 and 7, a bevel gear 350 disposed to mesh with the bevel gear 303 keyed to the rotatably journalled elevating screw nut 266.

To drive the longitudinally slidable table 15, Fig. 1, at a selected rate of speed, the wide faced gear 329, Fig. 6, journalled on the cross traversing shaft 330 is disposed to engage a spur gear 351 keyed to a table driving shaft 352 rotatably journalled toward the front central portion of the knee 13 in bearings 353 and 354, as shown in Fig. 6. The table driving shaft 352 is splined at its inner end in a manner to slidably engage a complementary internally splined hub of a bevel gear 355 which is rotatably journalled in the depending saddle bracket 344. From the horizontally journalled bevel gear 355, Fig. 6, power is transmitted to rotate a table feed screw (not shown) for effecting selective longitudinal movement of the table as fully explained in the aforementioned copending parent U.S. patent application, Serial No. 139,342, now Patent Number 2,736,243.

For effecting independent power driven movements of the knee 13, the saddle 14 and the table 15, clutch reversing mechanisms respectively associated therewith are disposed to be selectively actuated by separate control levers at the front of the machine. To effect a selective vertical adjustment of the knee 13 along the front face of the column 12, the control lever 26 at the front of the knee is operatively connected to actuate a shifting fork 374 engaging an annular groove in the clutch sleeve 345, as shown in Fig. 7, and is operable to shift the clutch sleeve into clutch engagement with one or another of the reversedly rotating spur gears 334 and 338. To effect a power driven movement of the saddle 14 toward or from the face of the column 12, the shiftable control lever 27, Figs. 1 and 6, at the front of the knee is connected to actuate a shifting fork 375, Figs. 6 and 7, engaging an annular groove formed in the clutch sleeve 339 for effecting shiftable movement of the sleeve into clutching engagement with either of the oppositely rotating spur gears 329 and 337, respectively. For effecting a selective longitudinal power driven movement of the table 15, there is provided at the front of the saddle 14, the shifting lever 28, Fig. 1, which is operatively connected to effect selective movement of the work table.

To drive the respectively slidable members at a fast or rapid traverse rate of speed, there is provided the clutching mechanism 317, Fig. 7, operatively connected to be actuated by the rapid traverse lever 31, Fig. 1, pivotally mounted at the rightward side of the knee 13 through a linkage mechanism (not shown). As schematically shown in Fig. 7, engagement of the clutching mechanism 317 will effect a transmittal of power from the constant speed rapid traverse drive shaft 316 to rotate the shaft 335 and the gear 338 keyed thereto at a fast or rapid traverse rate of speed.

For effecting manual longitudinal movement of the table 15, a handwheel 380 at the leftward end thereof is selectively connectable to effect rotation of the table screw (not shown) that is journalled to rotate in a pair of depending end brackets 371 and 372 secured to the opposite ends of the table 15. For effecting cross traversing movement of the saddle 14 and the table 15 slidably carried thereby, a handwheel 381 at the front of the knee 13 is selectively connectable to effect manual rotation of the cross traversing shaft 330 relative to its cooperating nut 343, as shown in Fig. 6. To effect vertical adjustment of the knee 13 relative to the column 12, a crank 382 at the front of the knee is journalled on a shaft extension 383, Fig. 6, in manner to be selectively connectable to effect manual rotation of an elevating shaft 384 journalled in the knee. A spur gear 385 keyed to the forward end of the shaft 384 is disposed to meshingly engage a cooperating spur gear 386 keyed to a second shaft 387 journalled in the leftward side of the knee 13 and which carries at its inner end a bevel gear 388 disposed to transmit power for effecting manually driven rotation of the bevel gear 302 keyed to the elevating screw nut 265.

To retain the rearward surface of the knee 13 in slidable engagement with a pair of vertical way surfaces 411 and 412 formed on the front face 293 of the column as shown in Fig. 6, there are provided a pair of rectangular gibs 413 and 414, respectively secured to a pair of vertical flanged guide members 415 and 416 integrally formed with the rearward vertical wall of the knee 13. To guidably retain the knee 13 for slidable movement in a vertical plane perpendicular to the front face 293 of the column 12, there is provided a longitudinally tapered gib 417 arranged to be adjustably secured between one side of the leftward column way surface 411 and a side 418 of a rectangularly shaped vertical section rearwardly extending from and integrally formed with the rearward wall of the knee. In a similar manner, as shown in Fig. 1, the saddle 14 is provided with a dovetail 395 adapted to be slidably received in a complementary guideway 392 formed in the top surface of the knee 13 for transverse movements. Likewise, the table 15 is slidably secured to the top surface of the saddle 14 for longitudinal movement.

Figure 8:
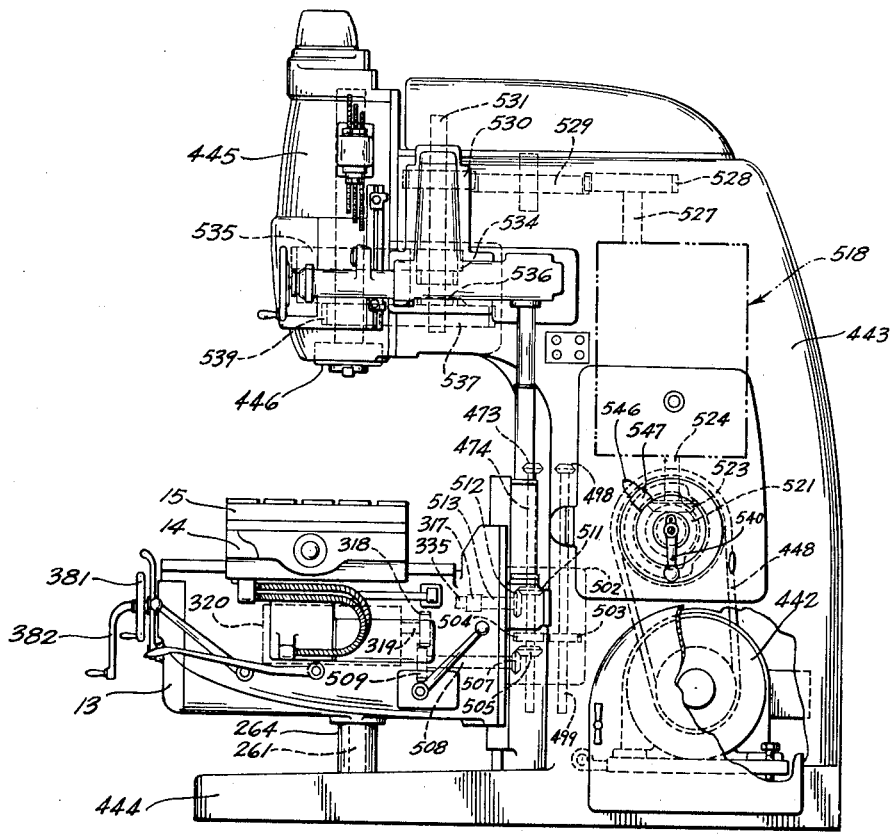
Fig. 8 is a view partly in left side elevation and partly in section, of a vertical spindle, knee and column type milling machine with parts broken away to show a portion of the driving mechanism and that incorporates a modified form of torque limiting control in combination with a unitary electro-hydraulic control system.

In Fig. 8, there is shown a vertical spindle milling machine of the knee and column type that is provided with a modified form of adjustable torque limiting control adapted to protect a speed transmission against predetermined varying degrees of overload. Although generally similar to the universal horizontal spindle machine as shown in Fig. 1, the vertical spindle machine in Fig. 8 is provided with a single main drive motor 442 that is operatively connectable to supply driving power for both rotating the tool spindle as well as effecting movement of the work supporting members. As will hereinafter be more fully explained, the adjustable torque limiting control incorporated in the vertical spindle machine, Fig. 8, constitutes a portion of a combined, unitary electro-hydraulic controlling system for the machine.

The milling machine shown in Fig. 8, comprises essentially an upstanding hollow column 443, integrally formed with a forwardly extending base 444, and carrying on its upper forward portion the vertically adjustable spindle head 445. A vertical tool spindle 446 rotatably journalled in the spindle head 445 is provided with a lower tool retaining end disposed to be in overlying relationship to a plurality of slidably superimposed work supporting members.

The general arrangement of the work supporting members relative to the vertical column 443, Fig. 8, is similar to the arrangement of the hereinbefore described work supporting members relative to the horizontal column 12, Fig. 1. As shown in Fig. 8, the knee 13 is slidably secured to the front face of the column 443 for selective vertical adjustment above the base 444. An elevating screw 261, enclosed within a telescoping housing 264, comprises one of a pair of elevating screws (the second of which is not shown) that are operatively connected to effect adjustment of the knee 13 relative to the base 444. The saddle 14 mounted on the upper face of the knee 13 for selective transverse adjustment relative to the column 443, in turn supports on its upper surface the work supporting table 15 that is longitudinally movable relative to the saddle.

Figure 9:
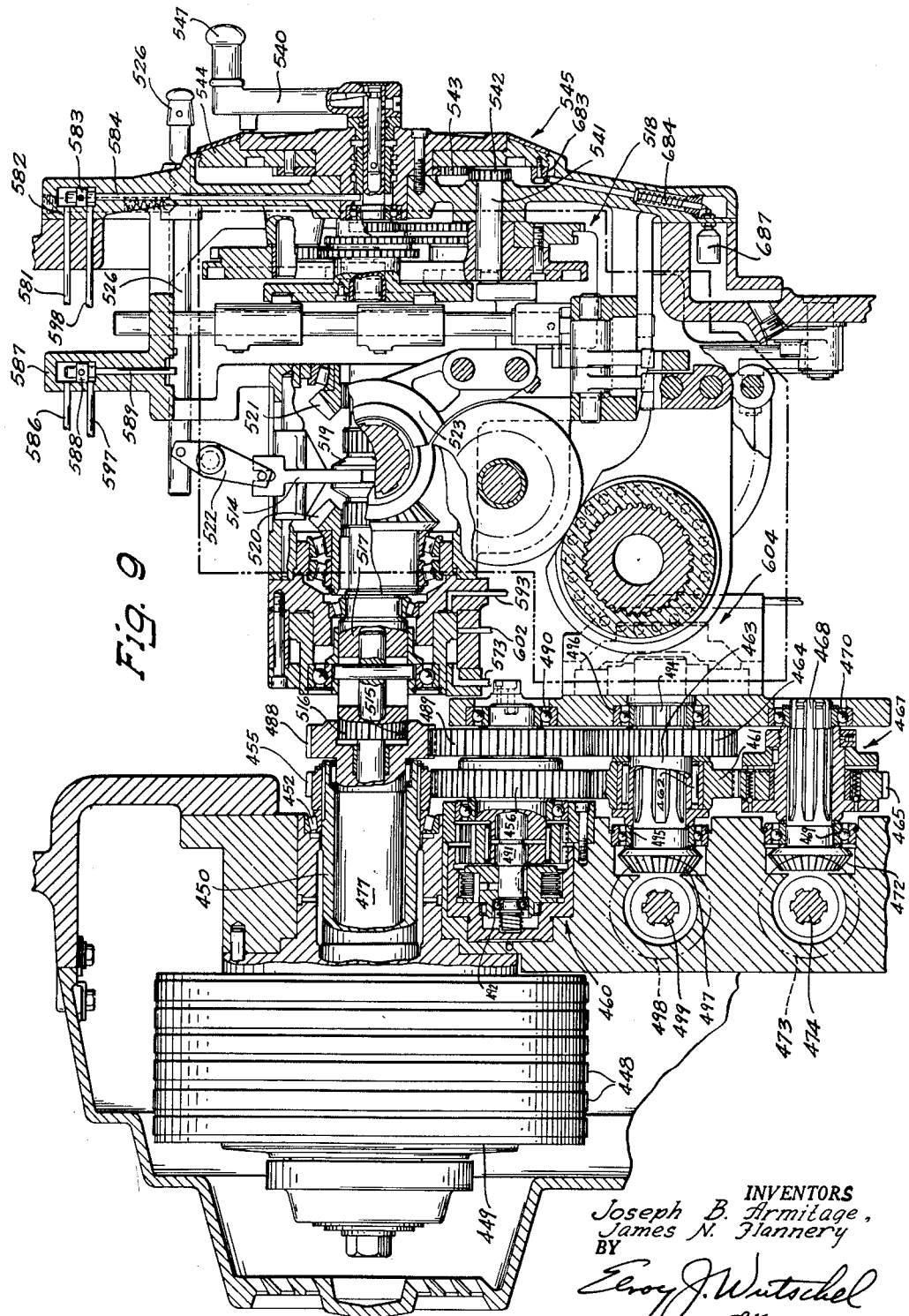
Fig. 9 is a view in transverse horizontal section through the machine column, taken through the central portion, particularly through the speed changer mechanism.

To drive the tool spindle 446 as well as the work supporting member, power is transmitted from the main drive motor 442 in the base by means of a plurality of V-belts 448 that are connected to drive a main driving pulley 449, as shown in Figs. 8 and 9.

The main drive pulley 449 is integrally formed with an inwardly extending hollow hub or sleeve 450 that is rotatably mounted in spaced apart bearings carried by a pulley bracket, one such bearing 452 being shown in Fig. 9. At its inner end, a gear 455 is secured to the hollow sleeve 450 in position to engage a complementary idler gear 456. The idler gear 456 is provided with an inwardly extending enlarged hollow hub that is rotatably journalled in a slow speed clutch mechanism 460. From the idler gear 456, power is transmitted to rotate another idler gear 461 rotatably journalled, by means of a bearing 462, on the hollow hub 463 of a concentrically mounted feed drive gear 464. The idler gear 461 in turn is connected to engage a rapid traverse drive gear 465 carried by an overload clutch unit 467 having its hub in splined engagement with a shaft 468 journalled within a pair of bearings 469 and 470. A bevel gear 472 integrally formed with the splined shaft 468 is disposed to meshingly engage a complementary bevel gear 473 secured to the upper end of a downwardly extending, splined rapid traverse drive shaft 474 as shown in Figs. 8 and 9. At its upper end the rapid traverse drive shaft 474 is rotatably journalled in the central portion of the machine column, and is operative to rotate at a fast rate of speed whenever the main drive motor 442 in the column is energized to rotate the main driving pulley 449.

As shown in Fig. 9, power for driving the work supporting members at a selected feed rate, as well as for driving the tool spindle 446, is derived from a hollow main drive shaft 477 that is rotatably journalled within the inwardly extending hollow pulley sleeve 450. A main clutch 478 is selectively operable to transmit driving power from the pulley 449 to rotate the hollow main drive shaft 477. To accomplish this, as shown in Figs. 9 and 10, a tubular clutch element 479 keyed to the outer end of the hollow main drive shaft 477 is provided with a plurality of driven clutch plates 480 adapted to be urged into engagement with a plurality of driving clutch plates 481 that are connected (in well known manner) at their outer periphery to be driven by the main driving pulley 449. To effect driving engagement between the pulley 449 and the tubular clutch element 479, a pressure plate 482 slidably carried by the tubular element 479 is connected to be moved axially inward by the operation of a plurality of circumferentially spaced, pivotally mounted clutch rocker arms 483. To pivot the outer ends of the rocker arms 483 outwardly for engaging the clutch 478, a cylindrical clutch actuating element 484 is secured to the outer end of a clutch actuating rod 485 extending inwardly through the hollow main drive shaft 477 for selective axial movement in either direction.

Thus, rightward axial movement of the actuating rod 485 operates to engage the clutch 478 in a manner that the power is transmitted directly from the main drive pulley 449 to rotate the hollow main drive shaft 477. Conversely, outward axial movement of the actuating shaft 485 operates to disengage the clutch 478. A gear 488 secured to the inner end of the hollow shaft 477 is connected to supply driving power to both the feed driving mechanism as well as to the spindle driving mechanism.

To drive the work supporting members at feed rate, as shown in Fig. 9, the gear 488 meshingly engages a feed idler gear 489 having a hub, on its outer face, rotatably supported within a bearing 490 and being integrally formed with an inwardly extending elongated shaft or hub 491 that extends through the hollow hub of the rapid traverse idler gear 456 and is rotatably supported at its extreme inner end by means of a bearing 492, within the slow speed clutch mechanism 460. The idler gear 489 in turn meshes with the feed driving gear 464 that is splined to a horizontally disposed feed driving shaft 494 journalled in a pair of spaced apart bearings 495 and 496. A bevel gear 497 integrally formed with the splined driving shaft 494 meshingly engages a complementary bevel gear 498 secured to the upper end of a vertically disposed feed driving shaft 499. The feed drive shaft 499 is journalled at its upper end within the column and is disposed to extend downwardly in spaced apart parallel relationship to the rapid traverse drive shaft 474.

Both the splined rapid traverse drive shaft 474 as well as the feed drive shaft 499 extend downwardly through a drive bracket 502 secured to the rearward face of the knee 13 for selective vertical movement therewith. An internally splined spur gear 503 journalled within the bracket 502 is maintained in slidable splined engagement with the feed drive shaft 499, and is disposed to meshingly engage a spur gear 504 integrally formed with a bevel gear 505 constituting a couplet that is rotatably journalled within the bracket 502. The couplet is thus disposed to encircle the rapid traverse drive shaft 474, without being in engagement therewith. A bevel gear 507 disposed to be driven by the gear 505 is secured to one end of a horizontal shaft 508 that carries at its opposite end a spur gear 509. From the gear 509 power is transmitted to rotate the cooperating spur gear 318 secured to the shaft 319 that in turn is connected to supply driving power for the feed transmission 320, carried within the vertically adjustable knee 13. From the feed transmission 320, as fully explained in conjunction with Figs. 6 and 7, power is transmitted by means of selectively engageable clutching mechanisms to effect feeding movement of the knee 13, the saddle 14, and the work table 15.

In a similar manner, power is transmitted from the vertically disposed rapid traverse driving shaft 474 to rotate an internally splined bevel gear 511 journalled within the bracket 502. The bevel gear in turn is disposed to engage a complementary bevel gear 512 secured to one end of a horizontally journalled drive shaft 513 extending inwardly into the hollow knee 13. From the rapid traverse drive shaft 513, power is transmitted to drive one or another of the work supporting members at rapid traverse rate by engaging the rapid traverse drive clutch 317 connected to transmit power to the shaft 335, as shown in Figs. 6 and 7.

For transmitting power from the main driving shaft 477 to drive the tool spindle 446, as shown in Fig. 9, the gear 488 is integrally formed with an internal gear 515 disposed to meshingly engage a gear 516 formed at the leftward end of a hollow shaft 517 journalled within the central rearward portion of the speed transmission mechanism 518. A shifting collar 519 is slidably splined to the central portion of the shaft 517 between a pair of spaced apart bevel pinions 520 and 521 journalled in the speed transmission 518 and which are disposed to rotatably encircle the drive shaft 517. The bevel pinions 520 and 521, constituting a part of a spindle reversing mechanism, are disposed to be engaged by a cooperating bevel gear 523 secured to one end of the vertical shaft 524 that is connected at its opposite end to supply driving power to the speed changing mechanism 518 carried within the hollow column 443. To drive the tool spindle in either selected direction of rotation, the shifting collar 519 is provided at its opposite ends with external gear teeth adapted to meshingly engage complementary internal gear teeth formed in the inwardly extending hubs of the bevel pinions 520 and 521 respectively.

The variable speed changing mechanism 518 is generally similar to the shiftably geared speed changing mechanism disclosed hereinbefore, shown in Fig. 2, and comprising both the speed changer A and the range changer B there shown. From the speed changing mechanism 518, power is transmitted to drive a vertical shaft 527 having secured thereto a spur gear 528 that engages an idler gear 529 rotatably journalled in the front upper portion of the column 443. The transmission of power continues from the idler gear 529 to a cooperatively meshing spur gear 530 journalled in the column 443 and having slidable splined engagement with a splined driving shaft 531 that is rotatably journalled at its lower end within a rearwardly extending portion of the spindle head 445, as shown in Fig. 8. For driving the tool spindle throughout a low and intermediate range of driving speeds, a shiftable gear couplet 534 is slidably splined to the vertical shaft 531 for axial shifting movement into driving engagement with a low speed gear 535 keyed to the tool spindle 446. To drive the tool spindle throughout a high range of speeds, the couplet 534 is axially shifted into driving engagement with an internal gear 536 provided in an adjacent face of a helical drive gear 537 concentrically journalled within the spindle head 445 for rotation independently of the vertical shaft 531. The drive gear 537, in turn, meshingly engages a high speed gear 539 affixed to the tool spindle 446. The shiftable gear couplet 534 thus constitutes a portion of a range change mechanism that corresponds generally to the range change mechanism shown in Fig. 2.

The variable speed mechanism 518 cooperates with the range changing mechanism, indicated by the shiftable couplet 534 in Fig. 8, for transmitting power from the main drive motor 442 to rotate the tool spindle 446 at a selected speed throughout an extremely wide range of driving speeds, in a manner similar to the speed changer A, range changer B and the range changer C shown in Fig. 2. As hereinbefore fully explained, the variable speed changing mechanism 518 and range change couplet 534, Fig. 8, are operative to transmit the full power of the driving motor 442 throughout the higher speeds. Whenever the tool spindle 446 is adjusted to rotate throughout the lowest available speeds, the variable speed mechanism 518 and couplet 534 operate at a reduced torque transmitting capacity because of the mechanical advantage of the shiftably connected gears contained therein.

To selectively adjust the speed rate of the spindle 466, a speed changing crank 540 rotatably journalled in the leftward side of the column 443 is operatively connected to actuate shifting mechanism (not shown) that in turn is operative to effect a coordinated shifting adjustment of the range changing couplet 534 and the speed changing mechanism 518. The speed changing crank 540 is rotatable throughout twenty-four revolutions corresponding to the twenty-four speed rates at which the tool spindle 446 is operable, each individual revolution of the crank 540 being operable to effect a single speed adjustment of the tool spindle 446. As shown in Fig. 9 the speed changing crank 540 is connected by means of reduction gearing (not shown) to rotate a shaft 541 and a pinion 542 secured thereto having meshing engagement with a ring gear 543 affixed to the inner face of a rotatably journalled speed changing dial 544. The arrangement is such that twenty-four revolutions of the speed changing crank 540 is operative to effect one complete revolution of the concentrically rotatable speed changing dial 544. To determine the selected rate of spindle speed, a speed change dial 544 is provided with indicia 545, corresponding to the twenty-four available speed rates, that are adapted to be separately read against a zero mark 546, as shown in Figs. 8 and 12.

To reverse the direction of spindle rotation, as shown in Fig. 9, the shifting collar 519 is provided with an annular groove that is engaged by a shifting fork 514 that is mounted for slidable movement. The shifting fork 514 is engaged by one end of a pivotally mounted actuating lever 522, the opposite end of which is engaged by an axially slidable reversing lever 526. Thus axial movement of the reversing lever 526 effects shiftable movement of the shifting collar 519 into driving engagement with one or another of the gears 521 and 520, or to a central neutral position therebetween.

Before rotating the speed changing crank 540 to adjust the speed rate, as shown in Figs. 9 and 10, it is necessary to withdraw a resiliently biased latching plunger knob 547 in order to withdraw a latching pin 548 from engagement with a cooperating latching notch, Fig. 10. Withdrawal of the latching plunger knob 547 simultaneously operates to effect pivotal movement of a lever 549 contained within the hollow crank arm 540 and that is connected at its opposite end to effect inward movement of an axially slidable pin 550 having secured to its opposite end a tubular valve member 551. As will hereinafter be more fully explained, inward movement of the tubular valve member 551 operates through the medium of the hydraulic control circuit shown in Fig. 10, to actuate the slow speed clutch mechanism 460 to rotate the entire speed train, as well as the feed train, at slow speed and thereby facilitate shiftable adjustment of the gears.

The tubular valve 551 is incorporated in the hydraulic control circuit, Fig. 10, and which in turn constitutes one portion of an improved electro-hydraulic control system, both for controlling the operation of the entire machine, as well as facilitating the changing of gears, and protecting the adjustable speed mechanism against excessive torque, at a selected speed. That portion of the improved electro-hydraulic control system constituting the electrical control circuit, Fig. 12, is operable both to effect energization of the main drive motor 442, as well as for controlling, in part, the operation of the hydraulic circuit, Fig. 10, that is connectable to supply power for activating the work supporting members and the tool spindle.

Hydraulic fluid, such as lubricating oil, for actuating the hydraulic control circuit is contained within a sump 552, Fig. 10, contained within the column 443. From the sump 552, hydraulic fluid is withdrawn through a conduit 553 by means of a pump 554 that is connected in well known manner to be operated whenever the main drive motor 442 is energized to rotate. From the pump 554 the flow of hydraulic fluid continues through a conduit 555 to a pressure regulating valve 556 and thence to a supply conduit 557. The pressure regulating valve 556 operates in well known manner both as a pressure regulating valve for maintaining the hydraulic pressure available through the conduit 557 at a constant value as well as a relief valve. With the valve member 551 in its rightward position, as shown in Fig. 10, the flow of pressure fluid continues from the conduit 557 to a pressure port 560 in a valve body 561, and thence about a cannelure 562 in the valve member 551 to a pressure port 563. From the pressure port 563 the fluid continues through a conduit 564 to a pressure port 565 in a solenoid controlled main starting valve 567. A solenoid coil 568 in the valve 567 is connectable to be electrically energized, to effect movement of an axially movable valve element 569 to its extreme rightward position within a cooperating circular cylinder in the valve, in opposition to a spring 570. With the solenoid 568 energized to effect rightward movement of the valve element 569, as shown in Fig. 10, pressure fluid continues from the pressure port 565 through a cannelure 572 in the valve element 569 to a conduit 573 that is connected to actuate the main drive clutch 478.

With the valve element 569 moved to its rightward or start position, as shown in Fig. 10, the fluid under pressure continues from the conduit 573 to one end of an annular hydraulic cylinder 574 that is formed concentrically with the drive shaft 517. Pressure fluid within the leftward end of the cylinder 574 operates to effect inner or rightward movement of a flanged tubular piston 575 movably mounted therein. An antifriction bearing 576 having its outer race affixed to the tubular piston 575 is likewise caused to be moved in a rightward direction. The inner race of the antifriction bearing 576 is affixed to a rotatable, tubular actuating element encircling the drive shaft 517 for relative axial sliding movement corresponding to the slidable movement of the tubular piston 575. A pin 579 secured to the rightward end of the clutch actuating rod 485 extends through a longitudinally extending diametral slot 580 in the drive shaft 517, and is secured at its opposite ends to the axially slidable, rotatable actuating element 577. Thus, rightward inner movement of the flanged tubular piston 575 operates to effect a corresponding rightward axial movement of the clutch actuating rod 485 to engage the main driving clutch 478 and effect rotation of the drive shaft 517.

Whenever the main driving clutch 478 is engaged as shown in Fig. 10, pressure fluid from the conduit 573 is operative to actuate an interlocking device to prevent accidental shiftable adjustment of the variable speed mechanism 518 and range change couplet 534, as well as to prevent reversal in the direction of spindle rotation. To accomplish this, a branch conduit 581 transmits fluid from the conduit 573 to one end of a cylinder 582, thus effecting inner movement of a piston 583 within the cylinder. A locking plunger 584 secured to the piston 583 is then moved inwardly to engage the extreme inner end of the tubular valve element 551 that is secured to the actuating pin 550 as hereinbefore explained. Engagement of the tubular valve element 551 with the locking plunger 584 operates to prevent accidental withdrawal of the speed change plunger knob 547, thereby preventing accidental shiftable adjustment of the variable speed mechanism whenever the main drive motor 442 is connected to rotate the tool spindle 446.

In a similar manner, as shown in Figs. 9 and 10, another branch conduit 586 is connected to transmit pressure fluid from the conduit 573 to one end of a hydraulic cylinder 587. Hydraulic pressure within the upper end of the cylinder 587 operates to urge a piston 588 downwardly in a manner that a latching plunger 589 secured thereto is moved into latching engagement with one of a plurality of latching notches formed on the inner end of the reversing lever 526.

Energization of the solenoid 568 to effect rightward movement of the valve element 569 simultaneously operates to connect an exhaust or return line leading to the sump 552. As shown in Fig. 10, the opposite end of the annular cylinder 574 is connected to an exhaust conduit 593 extending to an exhaust port within the starting valve 567, and thence via a cannelure 594 formed in the valve plunger 569 to another exhaust conduit 595 connected to permit return flow of the hydraulic fluid to the sump 552. Branch conduits 597 and 598 respectively connected to the opposite ends of pressure cylinders 587 and 582 are arranged to relieve the pressure therein.

As soon as the solenoid 568 is deenergized, the spring 570 effects leftward movement of the valve element 569 to its stop position, thereby simultaneously effecting disengagement of the main driving clutch 478 and upward disengaging movement of the latching plungers 589 and 584. Deenergizing the solenoid 568 is a prerequisite to effecting movement of the reversing lever 526 as well as rotatable movement of the speed adjusting crank 540. With the valve element 569 in leftward position, as shown in Fig. 11, the main pressure conduit 564 is connected via the cannelure 572 and the valve plunger to the conduit 593. Pressure fluid from the conduit 593 is transmitted through the branch conduits 597 and 598 to the lower ends of the respective cylinders 587 and 582. Pressure fluid thus admitted to the lower ends of the cylinders effects upward movement of the respective pistons 588 and 583, as well as the associated latching plungers 589 and 584, to disengage position thereby permitting axial movement of the reversing lever 526 and the tubular valve element 551.

Simultaneously therewith, pressure fluid flows from the conduit 593 to the inner end of the annular cylinder 574 to effect leftward movement of the flanged tubular piston 575 and, concomitantly therewith, disengagement of the main clutch 478. At the same time, leftward movement of the piston 575, as soon as the clutch 478 is disengaged, permits a flow of pressure fluid from the cylinder 574 through a pressure port 602 into a conduit 603. With this condition existing, i.e. after the clutch 478 is disengaged, pressure fluid continues from the conduit 603 into one end of a brake cylinder 604 associated with the splined feed drive shaft 494, as shown in Figs. 9 and 10. Pressure fluid in the brake cylinder 604 effects leftward movement of a piston 605 that is connected to actuate a friction brake 606 of the multiple disk type to immediately stop rotation of the feed drive shaft 494. As hereinbefore explained, the splined feed drive shaft 494 is interconnected in both the feed driving train as well as the speed driving train. Thus, braking the feed drive shaft 494 operates simultaneously to stop rotation of the tool spindle 446 and to stop feeding movement of the work supporting members. To facilitate the description, the operation of the hydraulic circuit in effecting a sequential disengagement of the main drive clutch 478 and actuation of the friction brake 606 has been described in considerable detail, as though considerable time elapsed between energizing the solenoid 568 and applying the brake 606. In actual practice and operation, however, the disengagement of the clutch 478 and actuation of the friction brake 606 occur almost instantaneously upon deenergization of the solenoid 568.

With the valve plunger 569 in its leftward position, as shown in Fig. 11, both of the latching plungers 589 and 584 are moved outwardly to permit actuating the reversing lever 526 and the speed changing crank 540. With this condition existing, outward movement of the spring biased plunger knob 547, as hereinbefore explained, effects inward movement of the slow speed tubular valve control element 551. With the tubular valve 551 moved inwardly, pressure fluid from the conduit 557 flows through the cannelure 562 in the tubular valve to a pressure conduit 608. The opposite end of the conduit 608 is connected to supply hydraulic fluid under pressure to a pressure cylinder 609 associated with the slow speed clutch mechanism 460, shown in Fig. 9. Pressure fluid in the cylinder 609 in turn operates to effect rightward movement of a piston 610 contained therein and that is connected to effect engagement of a multiple disk clutch 611. With the clutch 611 engaged, power is transmitted from the rapid traverse idler gear 456 through planetary speed reduction gearing of well known type, and thence through the clutch 611 to rotate the feed idler gear 489 at extremely slow speed. The mechanism 460 thus constitutes a planetary speed reduction clutch mechanism that is generally similar to that disclosed in U.S. Patent No. 2,385,907.

With the main driving clutch 478 disengaged as hereinbefore explained, and the feed driving gear 489 connected to be rotated at slow speed by the gear 456, the meshing gear 488 as well as the drive shaft 517 will be rotated at extremely slow speed to facilitate shiftable adjustment of the variable speed mechanism 518 and range change couplet 534. It will be apparent that the friction brake 606 must likewise be disengaged whenever the feed drive gear is connected to be rotated by the slow speed driving mechanism 460. To accomplish this, as shown in Fig. 10, inward movement of the valve element 551 operates to connect the conduit 564 to an exhaust conduit passage 614. With the start valve 567 in stop position as shown in Fig. 11, and the conduit 564 connected to the exhaust passage 614, as shown in Fig. 10, fluid pressure in the conduits 593 and 603 will be relieved. Thus, the friction brake 606 moves to disengaged position permitting rotation of the feed driving gears 464 and 489, Fig. 9.

To energize the main drive motor 442, Fig. 8, as well as to control the energization of the starting valve 567, Fig. 10, there is provided the improved electrical control circuit shown in Fig. 12. As there shown, electrical energy for operating the spindle motor 442, as well as the various control relays and other apparatus is derived from line conductors $L_1$, $L_2$ and $L_3$ that are connected to a source of power by means of a disconnecting switch 615 in the usual manner. In order to operate the motor 442 or any of the control elements, it is necessary to energize a control circuit that is represented in light lines in the drawings. Power for the control circuit is obtained from the transformer 616 having a primary winding, one terminal of which is connected to the line conductor $L_3$, one of the other line conductors in this instance the conductor $L_1$, being connected to one or another of a series of taps on the primary winding depending upon the voltage of the supply current. A secondary winding 617 of the transformer 616 is arranged to provide energy at the desired voltage for the control circuit, a pair of fuses being connected to the terminals of the secondary winding in the usual manner to afford protection in the event of an overload condition.

Energization of the control circuit is effected by depressing a normally open master start button switch 619, constituting a part of a master control station as shown in Fig. 12. With the start button switch 619 depressed, control current will flow from one terminal of the transformer secondary 617 through the associated fuse to a conductor 620. The flow of current continues through a normally closed stop button switch 621, through a conductor 622 and the closed start button switch 619 to a conductor 623 connected to one terminal of a coil 624 for a master control relay 625. The flow of control current energizes the coil 624, thus effecting upward movement of the relay 625 to a closed position, and then continues via return conductors 628, 629 to a conductor 630 that is connected through the fuse to the opposite terminal of the transformer secondary winding 617. As soon as the relay 625 moves upwardly to closed position by momentarily depressing the master start button switch 619, a holding circuit is established from the conductor 622, a shunt conductor 631, the closed contact bar 632 of the relay 625 to a conductor 633 connected to the conductor 623.

With the master control relay 625 energized to closed position, a normally open motor start button switch 636 may then be depressed to effect closure of a motor control relay 637 and thus effecting energization of the main drive motor 442, Figs. 8 and 12. Momentarily depressing the motor start switch 636, as shown in Fig. 12, effects a flow of control current from the energized conductor 623, through the normally closed motor stop switch 638 to a conductor 639. From the conductor 639, the control current continues through the closed start button switch 636 to a conductor 640 connected to one terminal of a coil 644 for the motor control relay 637. The flow of control current energizes the solenoid coil 644 to effect upward movement of the motor control relay 637 to closed position, and continues through the return conductor 629 connected to the energized return conductor 630. Energization of the control relay 637 to closed position effects upward movement of a pair of contact bars associated therewith into bridging engagement with associated sets of contacts. Thus, a holding circuit is completed from the conductor 639 through a shunt conductor 645, and thence through the closed contact bar of the relay 637 to the conductor 640.

At the same time, closure of the lower contact bar 647 completes a circuit from the energized conductor 630, through the contact bar associated with the master start relay 625, a conductor 648, the closed contact bar 647 to a conductor 649. The flow of control current continues from the conductor 649 to a conductor 650 connected to one terminal of a solenoid coil 651 associated with a motor starting relay 652. From the opposite terminal of the solenoid coil 651, the current flow continues through a conductor 653, the normally closed contact bar of a thermal overload relay 656, a conductor 657, and thence through the closed contact bar of a thermal overload relay 658 to a conductor 659, and a conductor 660 that is connected to the energized main conductor 620. The flow of control current from the conductor 650 through the solenoid coil 651, effects energization of the coil to actuate the motor starting relay 652 to an upwardly closed position to move the three contact bars associated therewith into bridging engagement with three respective sets of contacts for transmitting line current to energize the main drive motor 442.

With the motor start relay 652 energized to closed position, current is transmitted from the line conductor L₁, through a conductor 661, the closed contact bar of the relay 652 to a conductor 662. The flow of line current continues from the conductor 662 through the coil of the thermal overload control relay 656 to a conductor 663 connected to one terminal of the main drive motor 442. In a similar manner, line current is conducted from the line L₃, through a conductor 665, the closed contact bar of the relay to a conductor 667, and thence through the coil of the thermal overload relay 658 to a conductor 668 connected to another terminal of the motor 442. From the line conductor L₂, current is transmitted via a conductor 670, the closed contact bar of the relay 652 to a conductor 671 connected to one terminal of a solenoid coil 672 for a normally closed instantaneous overload control relay 673. From the opposite terminal of the coil 672, the flow of line current continues through a conductor 674, through the solenoid coil 676 of a normally closed instantaneous overload control relay 677 and thence to a conductor 678 connected to another terminal of the main drive motor 442.

The thermal overload control relays 656 and 658 respectively are operative in well known manner to protect the main drive motor 442 against gradually increasing, sustained overloads on the main drive motor. In the event of such a sustained overload condition on the motor 442, one or another of the coils associated with the thermal overload relays 656 and 658 is operative to move the contact bars of the relays to open position, and thus interrupt the holding circuit to the solenoid coil 651 of the motor starting relay 652. A sustained overload on the main drive motor 442, therefore, is cooperative to effect deenergization of the solenoid coil 651, permitting the relay 652 to drop to an open position to interrupt the transmission of line current and effect a deenergization of the main drive motor 442.

The solenoid coils of the instantaneous overload relays 673 and 677, however, are arranged to respond to different predetermined degrees of instantaneous loads on the main drive motor 442, as will hereinafter be more fully explained. Neither of the instantaneous overload relays 673 and 677 is operative to deenergize the main motor 442, and each of them is arranged to respond instantaneously whenever the main drive motor 442 is operative to supply different predetermined values of output power.

After the main drive motor 442 has been energized to rotate, a machine start button switch 680 may be momentarily depressed to energize the solenoid coil 568 for effecting movement of the valve element 569 of the starting valve 567 to its rightward position, as is shown in Figs. 10 and 12. It will be assumed first, that the speed selecting crank 540 has been adjusted to so position the speed indicating dial 544 that the tool spindle is operable to rotate at one or another of the five lowest operating speeds, as shown by the sector between the dotted lines 681 and 682 in Fig. 12. With the crank 540 positioned to operate the tool spindle at one of the five lowest speeds, and arcuately shaped cam 683 secured to the speed change dial 544 is operative to depress a plunger 684 that is normally biased in an outward direction by means of a spring 685. Outward movement of the plunger 684 operates to move a contact bar 686 of a normally closed torque control switch 687 to an open or disconnected position.

During this condition of operation, a momentary movement of the start switch 680 to closed position completes a control circuit extending from the energized conductor 649, through the normally closed machine stop switch 690 to a conductor 691, and thence through the closed start switch 680 to a conductor 692. The circuit continues from the conductor 692 through the solenoid coil of a spindle start relay 693 to a conductor 695, and through the contact bar of the normally closed, instaneous torque control relay 677 to a conductor 696. The control circuit is completed from the conductor 696 through the closed contact bar of the normally closed torque control relay 673 to a conductor 697 and a conductor 660 connected directly to the energized main supply conductor 620. Energization of the coil 694 in this manner effects an upward movement of the spindle start relay 693 to a closed position, thereby simultaneously completing a holding circuit for the relay as well as completing another control circuit for energizing the solenoid coil 568 of the main starting valve 567.

The holding circuit for the machine starting relay 693 is completed from the conductor 691, through a shunt conductor 698, the closed contact bar 702 and a conductor 703 connected to the conductor 692. At the same time, another control circuit is completed from the energized conductor 698, through the contact bar 704, the conductor 705, the solenoid coil 568 and the conductor 660 that is connected directly to the energized main supply conductor 620. The flow of current through the solenoid coil 568 effects rightward movement of the valve element 569 of the main starting valve 567 which is operable, as hereinbefore explained, to simultaneously engage the main driving clutch 478 to disengage the friction brake 606, and move the latching plungers 589 and 584 respectively to their inwardly latched position.

With the main driving clutch 478 engaged, and the speed selecting crank 540 positioned for slow speed operation, the tool spindle 446 is operative to rotate at one of the five lowest speeds as hereinbefore explained. During this condition of operation, the instantaneous overload relay 677 is moved to an open position in response to the solenoid coil 676 upon the occurrence of an overload exceeding approximately one-half the rated capacity of the main driving motor 442, and that exceeds the torque transmitting capacity of the spindle at the selected speed. Such an overload would result, for example, in the event a workpiece (not shown) carried by the work table 15, Fig. 8, is fed too rapidly into engagement with a cutter (not shown) carried by the tool spindle 446. At any rate, the overload exceeding approximately one-half the capacity of the motor 442 is directly the result of the combined load imposed by movement of the work table 15 and the tool spindle 446. Immediately upon the occurrence of such a reduced overload, the instantaneous overload control relay 677 is moved to an open position thus interrupting the holding circuit to the coil of the main starting relay 693, permitting the contact bars 702 and 704 thereof to drop to an open circuit interrupting position. The invention is not to be considered as limited to an arrangement in which the instantaneous relay is operatively interconnected in the circuit when the transmission is adjusted to operate at the lowest speeds. It will be apparent that, depending on the power of the motor and the torque transmitting capacity of the speed transmission, the mechanism could be so arranged as to interconnect the relay in the circuit with any other number of spindle speeds constituting the lower power range.

Movement of the contact bar 704 to open position in turn interrupts the holding circuit to the coil 568 of the starting valve 567, causing the valve element 569 contained therein to move to its leftward position. Leftward movement of the valve element 569 in turn effects disengagement of the main driving clutch 478 and an application of the brake 606, Fig. 10, to immediately stop feeding movement of the work table 15 and rotation of the tool spindle 446. As soon as the valve element 569 moves to its leftward position to disengage the clutch 478, the reduced overload on the main drive motor 442 is stopped permitting the contact bar of the instantaneous overload relay 677 to return to its normally closed position interconnecting the conductors 695 and 696 respectively. During slow speed operation of the machine, only the instantaneous relay 677 is operative to stop machine operation since the relay 673 is adjusted to respond to an overload exceeding the full capacity of the motor 442 and is therefore operative only during high speed operation.

After the main drive clutch 478 has been disengaged in response to operation of the instantaneous overload relay 677, the cause of the overload condition can be corrected by further reducing the speed of the tool spindle 446 or reducing the rate of feeding movement of the work table 15. After the cause of the overload condition has been determined and corresponding readjustments in speed or feed rate effected, the main drive clutch 478 can be again reengaged to continue the milling operation by depressing the starting switch 680. The instantaneous overload control relay 677 is thus operative to prevent damage to the speed changing mechanism whenever the mechanism is adjusted to operate at reduced torque transmitting capacity at one of its five lowest output speeds.

In a similar manner the instantaneous overload relay 673 is operative upon the occurrence of an overload exceeding the full capacity of the main drive motor 442 whenever the speed selecting lever 540 is adjusted to effect rotation of the tool spindle 446 at one or another of the nineteen highest operating speeds. To accomplish this, movement of the speed selecting lever 540 to adjust the tool spindle for high speed operation operates to move the cam 683 out of engagement with the actuating plunger 684. Thereupon, the plunger 684 is moved leftwardly in response to the spring 685 permitting closure of the contact bar 686 of the switch 687. Closure of the contact bar 686 in turn completes a shunt circuit extending from the conductor 695, a conductor 708, the contact bar 686 and thence through a conductor 709 to the conductor 696. With the shunt circuit thus completed by movement of the contact bar 686 to closed position, it will be apparent that movement of the contact bar of the instantaneous relay 677 will not interrupt the transmission of current from the conductor 695 to the conductor 696. Whenever the tool spindle 446 is adjusted to operate at one of the nineteen highest operating speeds, therefore, the instantaneous overload relay 673 is operative in response to an overload exceeding the full capacity of the main drive motor 442 to effect deenergization of the coil associated with the relay 693, which in turn operates to disengage the main drive clutch 478 as hereinbefore explained.

The instantaneous overload control relays 673 and 677 are arranged to be predeterminately operative in response to varying degrees of overload on the main drive motor 442 for effecting disengagement of the main drive clutch 478 to effect an immediate cessation in the movement of the work table 15 and the tool spindle 446. Because of the speed with which the clutch 478 is disengaged, as well as the quick application of the brake 606, Fig. 10, rotational movement of the tool spindle 446 is stopped almost instantaneously to preclude damage to a workpiece that is being operated upon when an overload condition arises.

In Fig. 13, there is shown a modified form of the predeterminately adjustable overload control mechanism described in conjunction with Fig. 12. The circuit shown in Fig. 13 is similar in operation excepting that closure of the contact bar 686 of the switch 687 is operative to complete a shunt circuit around the coil of the instantaneous relay 677, as shown in Fig. 13, instead of around the contact bar of the instantaneous relay 677, as shown in Fig. 12. Since the remainder of the circuit shown in fragmentary form in Fig. 13 is identical to that shown in Fig. 12, only the additional circuit connections and components required to effect the modified form of operation will be described.

With the tool spindle 446 adjusted to operate at one of the five lowest operating speeds, the coil 676 associated with the relay 677, Fig. 13, is interconnected in the power circuit to the motor by means of a conductor 711 interconnected between the coil 676 and the conductor 678 leading to one of the terminals of the motor 442. During this condition of operation, the instantaneous relay 677 is operative in response to an overload exceeding approximately one-half the rated capacity of the main motor 442 to interrupt the holding circuit to the coil of the starting relay 693.

Whenever the cam 683 is moved out of engagement with the actuating plunger 684 during high speed operation of the tool spindle, Fig. 13, the contact bar 686 of the switch 687 is moved to a closed position completing a secondary control circuit. With the contact bar 686 in closed position, a circuit is completed from the conductor 650, a conductor 712, the contact bar 686 to a conductor 714. From the conductor 714 the circuit continues through the coil 715 of a relay 716 and thence through a conductor 717 to the energized conductor 660. Energization of the solenoid coil 715 effects upward movement of the contact bar 718 for the relay 716 to a closed position. With the contact bar 718 in closed position a shunt circuit is completed from the conductor 674, a conductor 719 through the closed contact bar 718 to the conductor 678 connected to the terminal for the main drive motor 442. With this condition existing, it will be apparent that the coil 676 for the relay 677 is no longer interconnected in the power circuit to the motor 442. As a result, the coil 676 will not be energized during high speed operation of the tool spindle, as would be the case with the circuit shown in Fig. 12, whenever the load on the main drive motor 442 exceeded approximately one-half its full capacity. With the modified form of circuit shown in Fig. 13, therefore, only the relay 673 which is actually responsive to an overload exceeding the full capacity of the motor 442 is interconnected in the motor circuit during high speed operation of the tool spindle 446.

From the foregoing description of an illustrative milling machine and the associated actuating and controlling mechanism constituting an exemplifying embodiment of the present invention, it will be apparent that there has been provided an improved predeterminately adjustable overload control mechanism, that is responsive to varying degrees of overload in a manner to protect a transmission mechanism of a correspondingly varying torque transmitting capacity. The overload control mechanism is operative to prevent damage to the transmission mechanism irrespective of its torque transmitting capacity at any selected output speed.

Although the illustrative embodiment of the invention herein set forth has been described in considerable detail in order to make a full disclosure of practical operating mechanism, it is to be understood that the apparatus described is intended to be illustrative only and that the various novel features may be incorporated in other structural forms without departing from the spirit and scope of the invention as defined in the subjoined claims.

The principles of this invention having now been fully explained in connection with the foregoing description, we hereby claim as our invention:

1. In a milling machine, a column, a spindle journalled in said column, a cooperating work support movably mounted on said column for movement relative to said spindle, a pair of coordinately operable driving motors respectively connected to drive said tool spindle and said work support at a selected rate, a variable speed transmission mechanism operatively interposed between said spindle and said driving motor respectively associated therewith in a manner to selectively transmit power therebetween at a selected speed in a high or a low range, said transmission mechanism having a maximum torque transmitting capacity sufficient to transmit the full power of said driving motor when adjusted to operate in the high range but insufficient to transmit the full power of said motor when adjusted to operate at reduced speeds in the low range, a first torque limiting control operative to deenergize said work feeding motor on the occurrence of a degree of load on said spindle driving motor exceeding the full power transmitting capacity of said transmission mechanism, a second torque limiting control operative to a deenergize said work feeding motor on the occurrence of a degree of load on said spindle driving motor exceeding the reduced power transmitting capacity of said transmission mechanism, speed selecting means operative to adjust said variable speed transmission mechanism, and a selector device operating in conjunction with said speed selecting means and connected to render operative one or another of said torque limiting controls depending on whether said transmission mechanism is adjusted to operate at high speeds with full power transmitting capacity or at low speeds with reduced power transmitting capacity.

2. In a machine tool, a column, a work support movably carried by said column, an interruptable power driving mechanism operatively connected to move said work support at a selected feed rate, a tool support mounted on said column for rotational movement with respect to said movable work support, a shiftably geared variable speed transmission mechanism connected to drive said tool support at a selected speed rate, said transmission mechanism being adapted to operate with reduced torque transmitting capacity when adjusted to drive said tool support at the lower speeds, a main drive motor connected to drive said variable speed transmission mechanism and having a power rating that exceeds the reduced torque transmitting capacity thereof, a speed selecting mechanism connected to selectively adjust said variable speed transmission mechanism for varying the speed rate of said tool support, an adjustable overload torque control mechanism connected to be adjusted by said speed selecting mechanism in accordance with the selected output speed of said variable speed transmission mechanism, said adjustable overload torque control mechanism including a plurality of predeterminately differently adjusted overload control relays that are respectively and operatively connected to interrupt the operation of said power feed driving mechanism upon the occurrence of respectively different predetermined degrees of load on said main driving motor that varies according to the selected speed of said variable speed transmission mechanism.

3. In a milling machine, the combination with a column and power driven means associated with said column, of a spindle rotatably carried by said column, a spindle driving power transmission train disposed to be driven by said power driven means and including a variable speed mechanism operatively connected to drive said spindle throughout a wide selection of high and low speeds, said variable speed mechanism having sufficient torque transmitting capacity to transmit the full power of said power driven means when operating at high speeds but said transmission mechanism not having sufficient torque transmitting capacity to transmit the full power of said power driven means when operating under high torque in the low speeds, a translatable work support slidably mounted on said column for selective movement relative to said spindle, a separate feed driving motor mounted on said work support and connected to be coordinately operable with said power driven means, means for effecting selective movement of said work support including a plurality of telescoping members, a power driven train including a variable speed feed driving transmission mechanism operatively interposed between said feed driving motor and said telescoping members in manner to effect power driven movement of said work support at a rapid rate or at a selected feeding rate of speed, a torque limiting control including a plurality of predeterminately adjusted relays operatively connectable to deenergize said feed driving motor on the occurrence of different predetermined degrees of load on said power driven means that vary according to the power transmitting capacity of said variable speed mechanism at the selected output speed thereof, a selector mechanism arranged to effect an operative connection of one or another of said torque limiting control relays for deenergizing said feed driving motor, and a speed controller operatively connected to selectively adjust said spindle driving variable speed mechanism and simultaneously therewith to actuate said selector mechanism.

4. In a milling machine having a cutter spindle and a work feeding table, a shiftably geared variable speed apparatus operatively connected to drive said cutter spindle, a motor connected to drive said variable speed apparatus, a separate motor connected to drive said work feeding table at feeding rates, overload control mechanism comprising a plurality of predeterminately adjusted overload control relays that are respectively and operatively connected to deenergize said feeding motor in accordance with different predetermined degrees of overload on said spindle motor, switching means operative on said overload mechanism to operatively connect a selected one of said relays for effecting de-energization of said feeding motor in such a manner as to vary the degree of overload effective to deenergize said feeding motor in predetermined relation to the selected output speed of said variable speed apparatus, and a speed selecting mechanism operatively connected to effect shiftable adjustment of said variable speed apparatus and to effect coordinated predetermined actuation of said switching means.

5. In a machine tool having a tool spindle and a cooperatively mounted work supporting table, a motor disposed to drive said spindle with high torque for fast removal of metal at high speeds, a selectively adjustable variable speed transmission mechanism interconnecting said motor and said spindle and being operable to drive said spindle at a selected speed in a high or a low range, said transmission mechanism having sufficient torque transmitting capacity to transmit the full power of said motor in the high range but having insufficient torque transmitting capacity to transmit the full power of said motor when operating under high torque in the low speed range, a coordinately operable motor disposed to drive said table, a plurality of predeterminately adjusted overload control relays individually connectible to deenergize said work feeding motor on the occurrence of a predetermined degree of load on said spindle driving motor that varies according to the power transmitting capacity of said transmission, a speed selector mechanism operatively connected to adjust said variable speed transmission, and control means operative in conjunction with said speed selector mechanism to render operative a selected one of said overload control relays, whereby said transmission will be protected against transmitting power in excess of its graduated torque transmitting capacity at any selected rate of speed.

6. In a milling machine provided with a rotatably journalled tool spindle and a cooperating rectilinearly movable work support, a variable speed transmission mechanism operatively connected to drive said tool spindle, a spindle motor connected to drive said transmission mechanism, a speed changer connected to selectively adjust said transmission for varying the speed rate of said tool spindle, a separate feed motor connected to drive said work support for rectilinear movement relative to said tool spindle, power supply circuits including a source of electrical energy respectively connectible to energize said spindle motor and said feed motor, a plurality of predeterminately adjusted overload control relays respectively and individually connectible to de-energize said feed motor upon the occurrence of different degrees of load upon said spindle driving motor, switching means including shunt circuit means connectible to render a predetermined one of said overload control relays operable to de-energize said feed motor upon the occurrence of a predetermined degree of load on said spindle motor, and switch actuating means connected to be actuated by said speed changer and operable to actuate said switching means for rendering a predetermined one of said overload relays operable to de-energize said feed motor in predetermined relationship to the selected speed of said transmission and the degree of load upon said spindle motor.

7. In a milling machine provided with a rotatably journalled tool carrying spindle and a cooperating bodily movable work support, a variable speed transmission mechanism operatively connected to drive said tool spindle, a spindle motor connected to drive said transmission mechanism, a speed changer operatively connected to selectively adjust said transmission mechanism for varying the rate of said tool spindle, a separate feed motor connected to drive said work support for movement relative to said tool spindle, a selectively adjustable variable feed mechanism operatively interposed between said feed motor and said work support for selectively varying the feed rate thereof, a source of electrical energy, a control circuit connectible to control transmission of energy from said source for energizing said feed motor, a power supply circuit connectible to transmit energy from said source for energizing said spindle motor, a plurality of instantaneous overload control relays having their coils operatively connected in said power supply circuit, said overload relays being predeterminately adjusted to be energized upon different degrees of load upon said spindle driving motor, said overload relays being provided with contact bars that are respectively and operatively interconnectible in said feed motor control circuit and being respectively operable when actuated to de-energize said feed motor upon different degrees of load on said spindle motor, shunt circuit means including switching means respectively actuatable to interconnect one of the contact bars associated with one of said overload relays in said feed motor control circuit for de-energizing said feed motor in accordance with respectively different degrees of load upon said spindle motor, and actuating means connected to be actuated by said speed changer and being operative to actuate said switching means in accordance with a predetermined change in the selected speed of said spindle transmission whereby said feed motor is de-energized upon the occurrence of a predetermined degree of load on said spindle motor.

References Cited in the file of this patent

UNITED STATES PATENTS

| 1,371,772 | Blood | Mar. 15, 1921 |
| 1,796,332 | Johnson | Mar. 17, 1931 |
| 2,240,973 | Armitage | May 6, 1941 |
| 2,402,290 | Nenninger et al. | June 18, 1946 |
| 2,411,162 | King | Nov. 19, 1946 |
| 2,484,616 | Dulaney | Oct. 11, 1949 |
| 2,653,519 | Armitage et al. | Sept. 29, 1953 |
| 2,657,616 | Armitage et al. | Nov. 3, 1953 |
| 2,660,930 | De Vlieg et al. | Dec. 1, 1953 |
| 2,660,932 | Kemper et al. | Dec. 1, 1953 |